US012664838B2

(12) United States Patent
Marcinkowski et al.

(10) Patent No.: US 12,664,838 B2
(45) Date of Patent: Jun. 23, 2026

(54) SMART THERMOSTAT HUB WITH CELLULAR BACKHAUL CAPABILITY

(71) Applicant: EDST, LLC, Lubbock, TX (US)

(72) Inventors: Dave Marcinkowski, Lubbock, TX (US); Thomas Mandry, Lubbock, TX (US); Shawn Massie, Lubbock, TX (US); David Gilles, Lubbock, TX (US); Larry LaFreniere, Lubbock, TX (US); Tray Johnson, Lubbock, TX (US); Clinton A. Branch, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 304 days.

(21) Appl. No.: 18/328,318

(22) Filed: Jun. 2, 2023

(65) Prior Publication Data

US 2023/0316832 A1 Oct. 5, 2023

Related U.S. Application Data

(63) Continuation-in-part of application No. 17/512,577, filed on Oct. 27, 2021, now Pat. No. 12,080,115, (Continued)

(51) Int. Cl.
H04L 12/28 (2006.01)
G06F 3/0484 (2022.01)
(Continued)

(52) U.S. Cl.
CPC ....... G07C 9/00182 (2013.01); G06F 3/0484 (2013.01); G07C 9/00904 (2013.01);
(Continued)

(58) Field of Classification Search
CPC .............. G06F 3/0484; G06F 3/04847; G07C 2009/00198; G07C 2009/00333;
(Continued)

(56) References Cited

U.S. PATENT DOCUMENTS 9,057,210 B2    6/2015 Dumas et al.
9,478,084 B1    10/2016 Robinson
(Continued)

FOREIGN PATENT DOCUMENTS

EP    0533507 A1    3/1993
EP    2941844 A1    11/2015
(Continued)

OTHER PUBLICATIONS

Patent Cooperation Treaty, International Search Report and Written Opinion issued for PCT Application No. PCT/US2024/031998, dated Sep. 30, 2024, 8 pages.
(Continued)

*Primary Examiner* — Dionne Pendleton
(74) *Attorney, Agent, or Firm* — Norton Rose Fulbright US LLP

(57) ABSTRACT

Systems and methods for managing smart devices associated with a multi-family residential property are disclosed. A method of managing smart devices includes receiving, by a server from a first smart hub via a first network, information relating to operating conditions of each smart hub of a plurality of smart hubs. The first smart hub is operable as a gateway for relaying communications between the server via the first network and other smart hubs via a second network. The server monitors the operating conditions of each smart hub based on the information received from the first smart hub. Based on a detected change in the operating conditions of the first smart hub, the server selects a second smart hub to operate as the gateway. The server transmits one or more commands via the first network to switch the gateway from the first smart hub to the second smart hub.

25 Claims, 15 Drawing Sheets

Related U.S. Application Data which is a continuation of application No. 16/912,370, filed on Jun. 25, 2020, now Pat. No. 11,189,118, which is a continuation of application No. 16/162, 262, filed on Oct. 16, 2018, now Pat. No. 10,825,273.

(51) Int. Cl.
*G07C 9/00* (2020.01)
*H04W 12/04* (2021.01)

(52) U.S. Cl.
CPC ........... *H04L 12/283* (2013.01); *H04W 12/04* (2013.01); *G07C 2009/00198* (2013.01); *G07C 9/00309* (2013.01); *G07C 2009/00333* (2013.01); *G07C 2009/00357* (2013.01); *G07C 2009/00507* (2013.01); *G07C 2009/00769* (2013.01); *G07C 2009/00825* (2013.01)

(58) Field of Classification Search
CPC ........... G07C 2009/00357; G07C 2009/00507; G07C 2009/00769; G07C 2009/00825; G07C 2009/00865; G07C 9/00182; G07C 9/00309; G07C 9/00904; G07C 9/27; H04L 12/2825; H04L 12/283; H04L 12/2834; H04L 12/282; H04L 12/66; H04L 41/0668; H04L 43/16; H04L 47/125; H04L 63/08; H04L 63/107; H04L 67/1008; H04L 67/125; H04L 67/55; H04M 1/72415; H04W 12/04; H04W 28/02; H04W 88/16; H04W 28/0231; H04W 4/38; H04W 4/70; H04W 12/06; H04W 12/64; H04W 16/26; H04W 24/02; H04W 24/10; H04W 28/0215; H04W 28/088; H04W 4/06; H04W 4/08; H04W 4/60; H04W 4/80; H04W 40/12; H04W 40/22; H04W 72/04; H04W 88/08; H04B 1/3838; H04B 17/318; H04B 17/382; H04B 7/15571; H04B 7/15578; H02J 50/50; H01Q 1/2291; H01Q 1/245; H01Q 1/525; H01Q 19/26
See application file for complete search history.

(56) References Cited

U.S. PATENT DOCUMENTS

| | | | |
|---|---|---|---|
| 9,666,000 | B1 | 5/2017 | Schoenfelder et al. |
| 9,875,647 | B1 | 1/2018 | Tannenbaum et al. |
| 10,313,303 | B2 | 6/2019 | Baum et al. |
| 10,530,598 | B2 | 1/2020 | Ansari et al. |
| 11,162,698 | B2 | 11/2021 | Ajax et al. |
| 11,164,435 | B1 | 11/2021 | Skeoch |
| 11,189,118 | B2 | 11/2021 | Marcinkowski et al. |
| 11,349,707 | B1 | 5/2022 | Gerstberger et al. |
| 11,381,784 | B1 | 7/2022 | Siminoff |
| 2005/0210283 | A1 | 9/2005 | Kato |
| 2010/0283579 | A1 | 11/2010 | Kraus et al. |
| 2012/0179802 | A1 | 7/2012 | Narasimhan et al. |
| 2013/0305319 | A1 | 11/2013 | Matthews, III et al. |
| 2014/0267740 | A1 | 9/2014 | Almomani et al. |
| 2015/0276254 | A1 | 10/2015 | Nemcek et al. |
| 2015/0287256 | A1 | 10/2015 | Davis |
| 2016/0005247 | A1 | 1/2016 | Mehl et al. |
| 2016/0124401 | A1 | 5/2016 | Li |
| 2016/0239001 | A1 | 8/2016 | Chin et al. |
| 2016/0327921 | A1 | 11/2016 | Ribbich et al. |
| 2016/0330565 | A1 | 11/2016 | Jayaram et al. |
| 2016/0364114 | A1 | 12/2016 | Von Dehsen et al. |
| 2017/0046893 | A1 | 2/2017 | Tseng et al. |
| 2017/0185278 | A1 | 6/2017 | Sundermeyer et al. |
| 2017/0257257 | A1 | 9/2017 | Dawes et al. |
| 2017/0295514 | A1* | 10/2017 | Uchida .............. H04L 67/1008 |
| 2017/0301165 | A1 | 10/2017 | GrandPre et al. |
| 2018/0063150 | A1 | 3/2018 | Rovito et al. |
| 2018/0091930 | A1 | 3/2018 | Jefferies |
| 2018/0110093 | A1 | 4/2018 | Deros et al. |
| 2018/0182191 | A1 | 6/2018 | Wagstaff |
| 2018/0234489 | A1 | 8/2018 | Hammons et al. |
| 2018/0350170 | A1 | 12/2018 | Wang et al. |
| 2019/0043289 | A1 | 2/2019 | Cahill |
| 2019/0190992 | A1* | 6/2019 | Warrick ............... H04L 67/125 |
| 2019/0327128 | A1* | 10/2019 | Harpole ................. H04L 45/28 |
| 2019/0371096 | A1 | 12/2019 | Fisher |
| 2020/0028732 | A1* | 1/2020 | Akagami ............. H04W 28/02 |
| 2020/0090441 | A1 | 3/2020 | Kuenzi |
| 2020/0107402 | A1 | 4/2020 | Di Girolamo et al. |
| 2020/0118370 | A1 | 4/2020 | Marcinkowski et al. |
| 2020/0118371 | A1 | 4/2020 | Marcinkowski et al. |
| 2020/0242863 | A1 | 7/2020 | Chang et al. |
| 2021/0142601 | A1 | 5/2021 | Schoenfelder et al. |
| 2021/0319639 | A1 | 10/2021 | Ho et al. |
| 2021/0320875 | A1 | 10/2021 | Guim Bernat et al. |
| 2021/0407234 | A1 | 12/2021 | Li et al. |
| 2021/0409243 | A1 | 12/2021 | Yang et al. |
| 2021/0410116 | A1* | 12/2021 | Zhang ................... H04W 24/02 |
| 2022/0130189 | A1 | 4/2022 | Marcinkowski et al. |
| 2022/0302575 | A1* | 9/2022 | Bank ...................... H01Q 1/245 |
| 2023/0065085 | A1* | 3/2023 | Ben Hamozeg ..... H04B 17/318 |
| 2023/0263393 | A1 | 8/2023 | Ray et al. |

FOREIGN PATENT DOCUMENTS

| | | |
|---|---|---|
| EP | 3107073 A1 | 12/2016 |
| WO | WO-2014107196 A1 | 7/2014 |

OTHER PUBLICATIONS

International Search Report and Written Opinion issued for PCT Application No. PCT/IB2019/057876, dated Dec. 10, 2019, 30 pages.

European Patent Office, Communication, Extended European Search Report issued for European Patent Application No. 19872494.0, dated Nov. 12, 2021, 7 pages.

Joe Miragliotta "Kwikset Kevo Now Works With Nest," Kwikset Locks: Smart Security Blog, Feb. 9, 2015, https://www.smartsecurityblog.com/kevo-smart-lock-nest-learning-thermostat/, 3 pages.

Michael McCole "How to Make Nest's Thermostat Your Smart-Home Hub," WIRED, Feb. 10, 2016, https://www.wired.com/2016/02/iotcookbook-nest/, 9 pages.

United States Patent and Trademark Office, Patent Trial and Appeal Board, *Iapartments, Inc.* v. *EDST LLC*, IPR-2022-01468, U.S. Pat. No. 10,825,273, Termination Due to Settlement After Institution of Trial, dated May 2, 2023, 5 pages.

United States Patent and Trademark Office, Patent Trial and Appeal Board, *Iapartments, Inc.* v. *EDST LLC*, IPR-2022-01469, U.S. Pat. No. 10,803,685, Termination Due to Settlement After Institution of Trial, dated May 2, 2023, 5 pages.

United States Patent and Trademark Office, Patent Trial and Appeal Board, *Iapartments, Inc.* v. *EDST LLC*, PGR 2022-00059, U.S. Pat. No. 11,189,118, Termination Due to Settlement After Institution of Trial, dated May 2, 2023, 5 pages.

European Patent Office, Communication, Extended European Search Report issued for European Patent Application No. 23215303.1, dated Mar. 7, 2024, 10 pages.

* cited by examiner

Figures 8, 9:
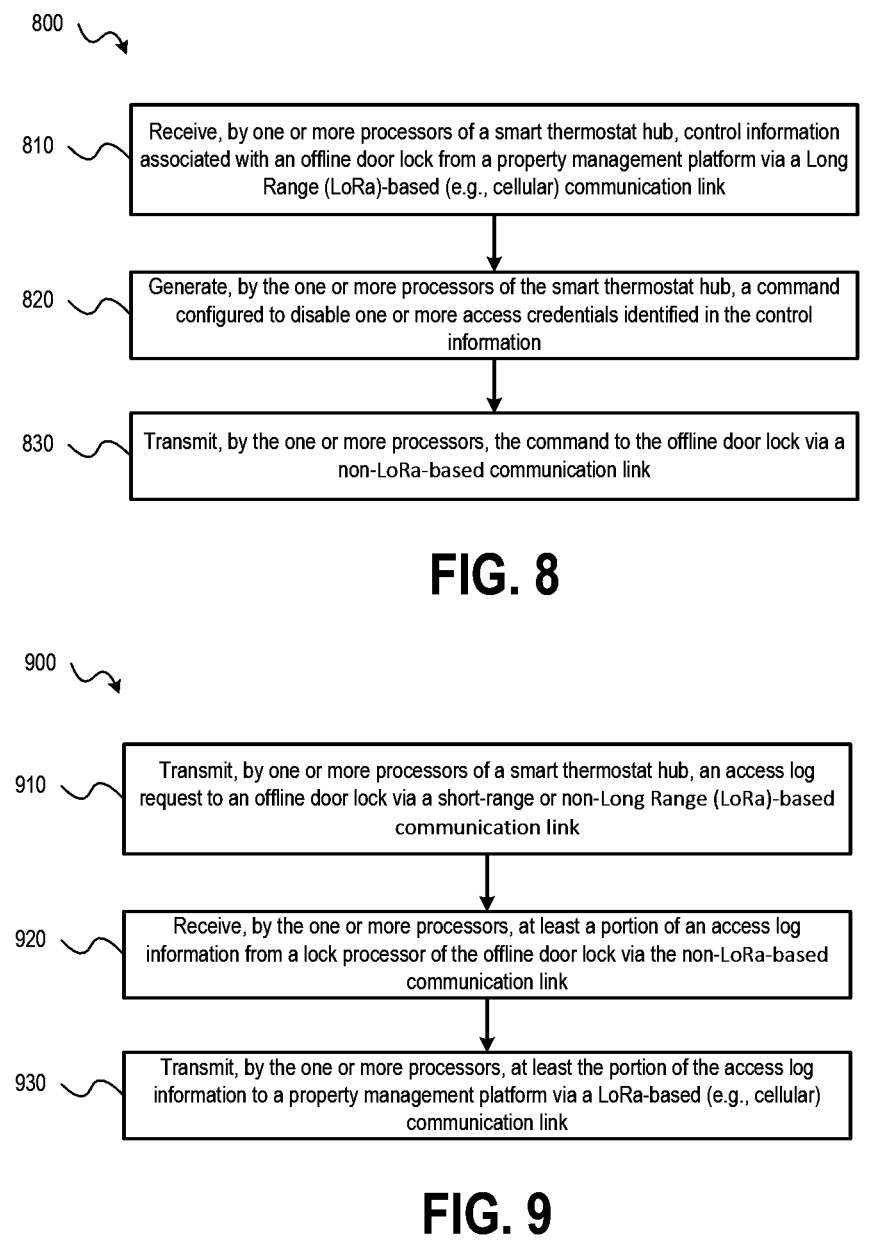

800

810　Receive, by one or more processors of a smart thermostat hub, control information associated with an offline door lock from a property management platform via a Long Range (LoRa)-based (e.g., cellular) communication link 820　Generate, by the one or more processors of the smart thermostat hub, a command configured to disable one or more access credentials identified in the control information 830　Transmit, by the one or more processors, the command to the offline door lock via a non-LoRa-based communication link

910　Transmit, by one or more processors of a smart thermostat hub, an access log request to an offline door lock via a short-range or non-Long Range (LoRa)-based communication link 920　Receive, by the one or more processors, at least a portion of an access log information from a lock processor of the offline door lock via the non-LoRa-based communication link 930　Transmit, by the one or more processors, at least the portion of the access log information to a property management platform via a LoRa-based (e.g., cellular) communication link

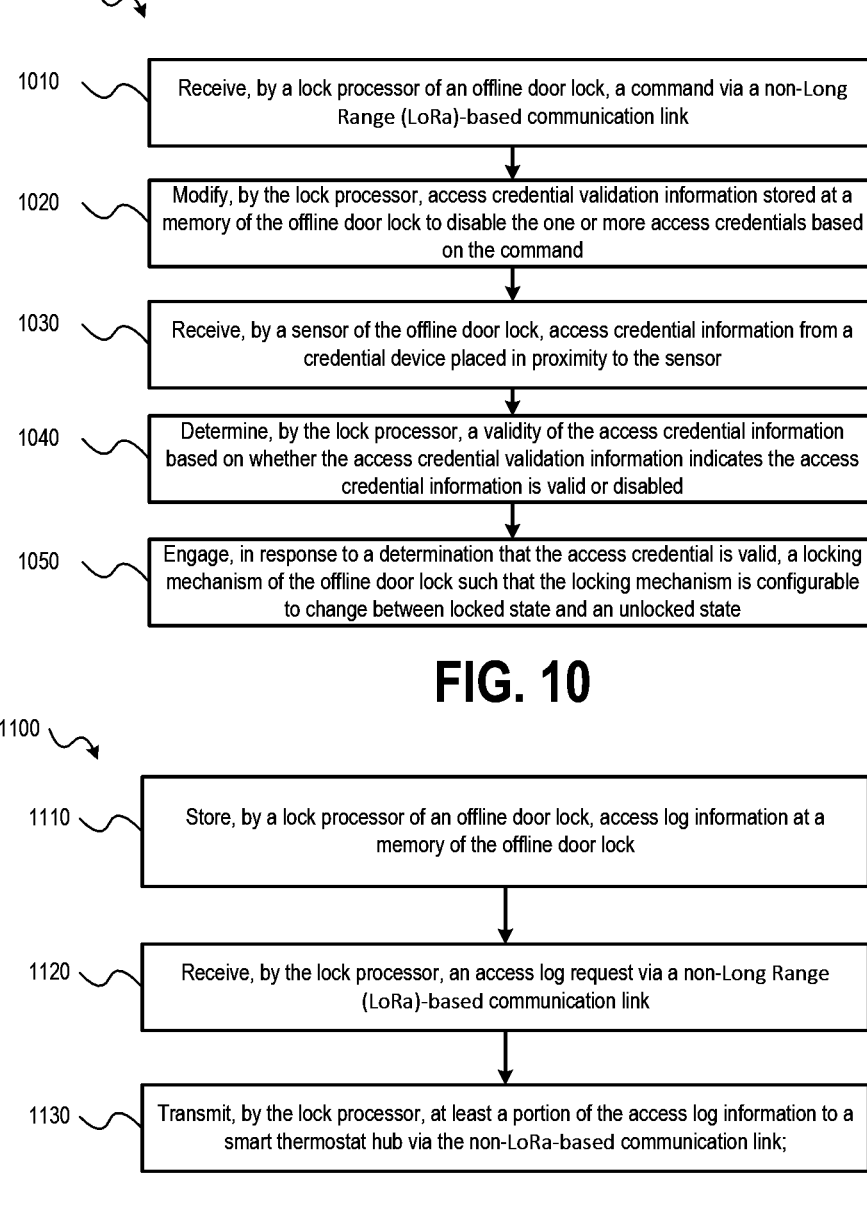

1010 — Receive, by a lock processor of an offline door lock, a command via a non-Long Range (LoRa)-based communication link 1020 — Modify, by the lock processor, access credential validation information stored at a memory of the offline door lock to disable the one or more access credentials based on the command 1030 — Receive, by a sensor of the offline door lock, access credential information from a credential device placed in proximity to the sensor 1040 — Determine, by the lock processor, a validity of the access credential information based on whether the access credential validation information indicates the access credential information is valid or disabled 1050 — Engage, in response to a determination that the access credential is valid, a locking mechanism of the offline door lock such that the locking mechanism is configurable to change between locked state and an unlocked state

1110 — Store, by a lock processor of an offline door lock, access log information at a memory of the offline door lock 1120 — Receive, by the lock processor, an access log request via a non-Long Range (LoRa)-based communication link 1130 — Transmit, by the lock processor, at least a portion of the access log information to a smart thermostat hub via the non-LoRa-based communication link;

FIG. 11

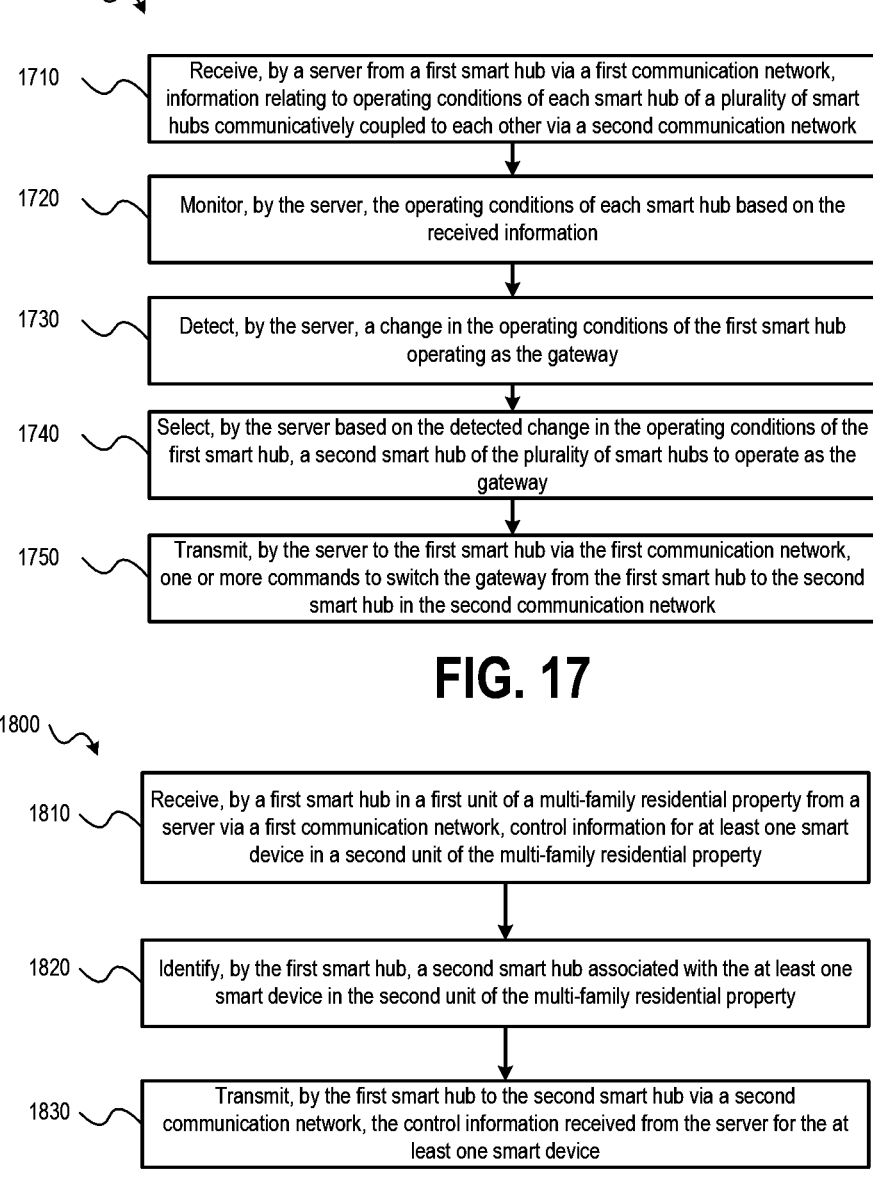

1700

1710    Receive, by a server from a first smart hub via a first communication network, information relating to operating conditions of each smart hub of a plurality of smart hubs communicatively coupled to each other via a second communication network 1720    Monitor, by the server, the operating conditions of each smart hub based on the received information 1730    Detect, by the server, a change in the operating conditions of the first smart hub operating as the gateway 1740    Select, by the server based on the detected change in the operating conditions of the first smart hub, a second smart hub of the plurality of smart hubs to operate as the gateway 1750    Transmit, by the server to the first smart hub via the first communication network, one or more commands to switch the gateway from the first smart hub to the second smart hub in the second communication network

1810    Receive, by a first smart hub in a first unit of a multi-family residential property from a server via a first communication network, control information for at least one smart device in a second unit of the multi-family residential property 1820    Identify, by the first smart hub, a second smart hub associated with the at least one smart device in the second unit of the multi-family residential property 1830    Transmit, by the first smart hub to the second smart hub via a second communication network, the control information received from the server for the at least one smart device

SMART THERMOSTAT HUB WITH CELLULAR BACKHAUL CAPABILITY

CROSS-REFERENCE TO RELATED APPLICATIONS

The present application is a continuation-in-part of U.S. patent application Ser. No. 17/512,577, filed on Oct. 27, 2021, entitled "SMART THERMOSTAT HUB"; which is a continuation of U.S. patent application Ser. No. 16/912,370, filed on Jun. 25, 2020 and issued as U.S. Pat. No. 11,189,118 on Nov. 30, 2021, entitled "SMART THERMOSTAT HUB"; which is a continuation of U.S. patent application Ser. No. 16/162,262, filed on Oct. 16, 2018 and issued as U.S. Pat. No. 10,825,273 on Nov. 3, 2020, entitled "SMART THER-MOSTAT HUB"; the disclosures of which are incorporated by reference herein in their entirety.

TECHNICAL FIELD

The present disclosure is directed to an intelligent thermostat. In particular, the present disclosure is directed to an intelligent thermostat that can function as a hub having multi-band/multi-radio communication capabilities, long range network backhaul capabilities, and can be implemented in a system for controlling and securing smart door locks and other smart devices within a multi-family property.

BACKGROUND

Technology and the benefits it provides often plays an important role with respect to how many consumers make decisions. This has become increasingly so in the real-estate industry, and more specifically in the multi-family residential property market. To illustrate, Class A multi-family residential properties (e.g., apartments, etc.) may have keyless entry systems installed that allow residents to gain entry into their respective apartments by placing a key fob (or "fob"), smartphone, or smartcard in proximity to a door lock. As another example, these Class A multi-family residential properties may have been constructed with infrastructure, such as Wireless Fidelity (Wi-Fi) access points and/or wired networks (e.g., Ethernet), for providing Internet access to residents. While the security and convenience these technologies provide are attractive to residents, deploying such technologies in older multi-family residential properties, such as Class B and C multi-family residential properties, can be cost prohibitive and/or present challenges with respect to the security of residents of the multi-family residential property.

For example, keyless entry systems may utilize various types of smart door locks. Such a smart door lock may be controlled (e.g., locked and unlocked) remotely through an Internet-accessible network connection and/or locally by a device (e.g., a fob, smartphone, smartcard, etc.) that is placed in proximity to a sensor of the door lock. The cost to deploy a smart door lock-based keyless entry system in a multi-family residential property can be significant due to the requirement that a local area network (LAN) communication infrastructure (e.g., a property-wide mesh network, a Wi-Fi network, etc.) be provided to facilitate network-based control of the door lock.

Even with a LAN infrastructure in place, smart door lock-based keyless entry systems present challenges with respect to security and reliability. For example, the Wi-Fi network of the multi-family residential property may be vulnerable to security threats, such as hackers. Also, Wi-Fi network performance can be unpredictable due to interference caused by physical obstructions, other wireless networks, and electronic devices in the area. Also, not all smart door locks can be controlled and managed remotely, for example, by using a network-based application (e.g., a cloud-based application or website) to authorize or disable access credentials. Proximity-based smart door locks require an individual, such as a property manager or property maintenance personnel, to connect (e.g., via a universal serial bus (USB) connection) an external device (e.g., a laptop, tablet, or other electronic device) to the door lock and then use software or another utility provided by the external device to configure the access credentials. The requirement that access credentials for such proximity door locks be disabled in person presents risks with respect to the security of residents of a multi-family residential property. For example, if a resident's access credential (e.g., fob, smartcard, etc.) is lost or stolen, the access device may be used to gain entry into the resident's apartment before the appropriate personnel can visit the resident's apartment and use an external device to disable the lost or stolen access credential. As another example, if a resident gives an access credential to a non-resident and then has a falling out with the non-resident, the resident cannot prevent the non-resident from using access credential to gain entry into the resident's apartment and must wait until the appropriate personnel can visit the resident's apartment to disable the access credential provided to the non-resident.

SUMMARY

Embodiments described herein provide a system that comprises smart thermostat hubs and a management platform for controlling and securing smart devices in a multi-family residential property. In some embodiments, a smart thermostat hub located within a unit of the multi-family residential property may comprise various communication interfaces to facilitate bi-directional communications between the smart thermostat hub and other devices in the system over different types of communication networks. For example, the smart thermostat hub may include a first communication interface that facilitates bi-directional communication between the smart thermostat hub and the management platform via a cellular communication network. The smart thermostat hub may also include a second communication interface that facilitates bi-directional communication between the smart thermostat hub and various smart devices, e.g., smart door locks, smart lights, wireless cameras, security devices, smart TVs, smart speakers, entertainment devices, etc., present within a unit of the multi-family residential property via a wireless personal area network (WPAN), e.g., a Wi-Fi or Bluetooth network, associated with the unit. The smart thermostat hub may provide, for example, a gateway or bridge between the management platform and a smart door lock within the unit, thereby enabling access credentials for the smart door lock to be disabled from the management platform via the different bi-directional communication links provided by the first and second communication interfaces of smart thermostat hub.

In addition to providing enhanced the security for smart door lock-based keyless entry systems, smart thermostat hub may also provide functionality for automating and improving various property management tasks. For example, the management platform may be configured to automatically detect (e.g., based on a database) when a unit of a multi-family residential property becomes vacant and may transmit control information to smart thermostat hub of the vacant unit. The control information may include information that identifies various smart devices within the unit, as well as parameters for configuring the identified smart devices. Upon receiving the control information via first communication interface, smart thermostat hub may transmit commands to each of the identified smart devices via second communication interface, where the commands configure the identified smart devices in accordance with parameters specified in the control information. Similar operations may be performed when the management platform detects that a resident is scheduled to move in to a vacant unit of the multi-family residential property.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 8 is a flow diagram illustrating an exemplary method for securing smart devices within an apartment of a multi-family residential property in accordance with embodiments of the present disclosure;

FIG. 9 is a flow diagram of an exemplary method for retrieving access log data from a smart door lock in accordance with embodiments of the present disclosure;

FIG. 10 is a flow diagram illustrating an exemplary method for securing a smart door lock of an apartment of a multi-family residential property in accordance with embodiments of the present disclosure;

FIG. 11 is a flow diagram illustrating an exemplary method for securing a smart door lock of an apartment of a multi-family residential property in accordance with embodiments of the present disclosure;

FIG. 17 is a flowchart of an exemplary process for managing smart devices associated with a multi-family residential property in accordance with embodiments of the present disclosure;

FIG. 18 is a flowchart of an exemplary process for configuring smart devices within multiple units of a multi-family residential property in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
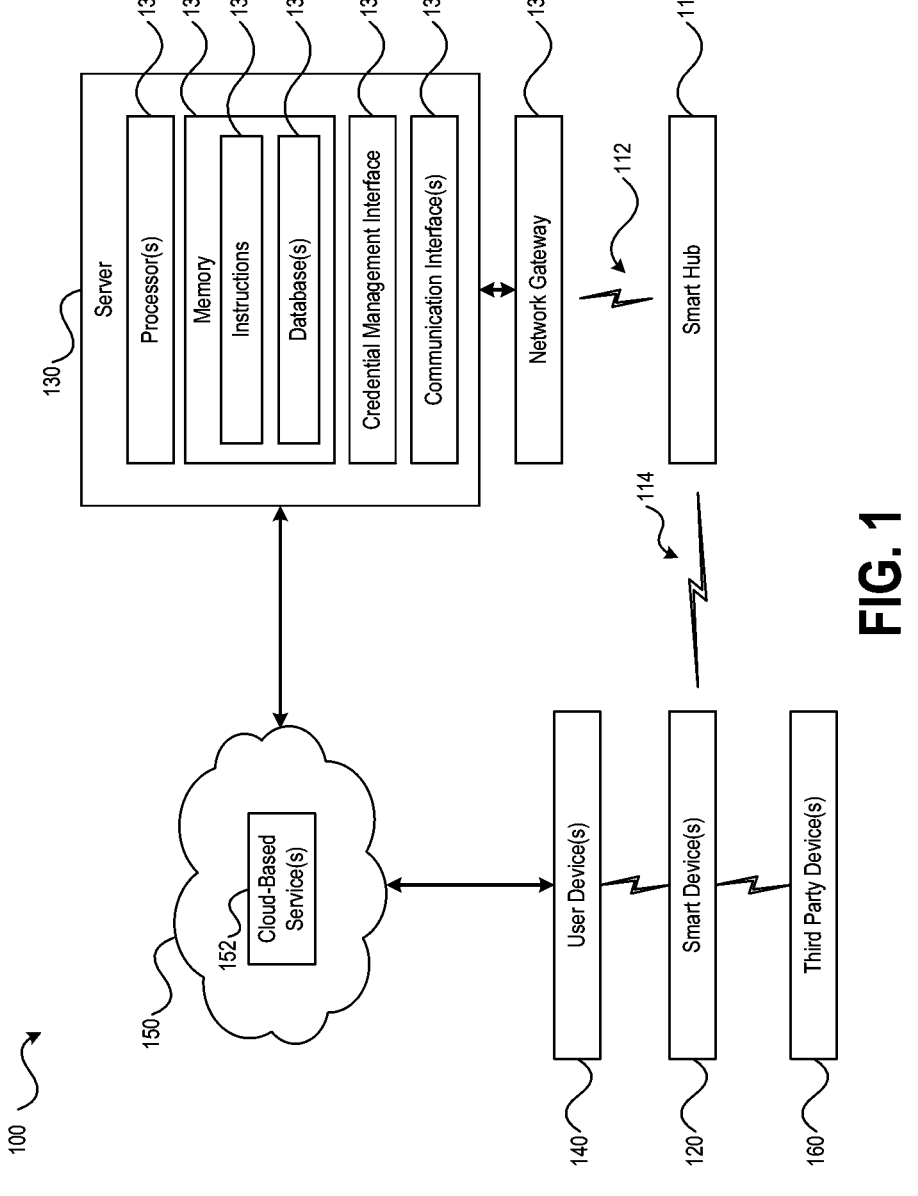
FIG. 1 is a block diagram of a system for managing and securing access credentials for smart devices within a multi-family residential property in accordance with embodiments of the present disclosure.

Referring to FIG. 1, a block diagram of an exemplary system for managing and securing access credentials for accessing a multi-family residential property using smart devices in accordance with aspects of the present disclosure is shown as a system 100. As described in more detail below, system 100 provides functionality that improves the manner in which access to multi-family residential properties is managed and secured. Additionally, system 100 may reduce the cost of deploying various technologies in a multi-family residential property, thereby enabling such technologies to be utilized in certain multi-family residential properties for which previous technologies were deemed cost prohibitive, such as Class B and Class C properties.

In FIG. 1, system 100 is illustrated as comprising smart hub 110, one or more smart devices 120, and server 130. As shown in FIG. 1, server 130 may include one or more processors 132, memory 133, credential management module 137, and one or more communication interfaces 138. Memory 133 may include random access memory (RAM), read only memory (ROM), hard disk drives(s) (HDDs), solid state drive(s) (SSDs), network attached storage (NAS) devices, or other types of memory devices for storing data in a persistent or non-persistent state. Memory 133 may store instructions 134 that, when executed by the one or more processors 132, cause the one or more processors 132 to perform the operations of server 130 described with reference to FIGS. 1-6. Additionally, one or more databases 135 may be stored at memory 133. Exemplary types of information that may be stored at the one or more databases 135 are described in more detail below. It is noted that although FIG. 1 illustrates server 130 as a standalone device, it is to be understood that server 130 and the functionality described herein with respect to the server 130, may be implemented using more than one server or via a collection of computing resources (e.g., processors, memory, communication interfaces, and the like) deployed in the cloud.

Credential management interface 137 may be configured to manage (e.g., create and disable) access credentials provided to residents of a multi-family residential property. For example, credential management interface 137 may be configured to generate access credentials that enable a resident to access one or more residential units of a multi-family residential property. Such a unit may correspond to, for example, the individual resident's apartment unit or a designated common area, such as a workout facility, a pool, a parking garage, a lounge, a conference room, a laundry room, a vending machine room, a lobby, an elevator, and the like, within the multi-family residential property. Access credentials may be stored on a device, such as a fob, a smartcard, or a resident's smartphone, which may be used to control (e.g., lock and unlock) a smart door lock installed on a door of the resident's apartment. In an embodiment, each of the smart door locks of the multi-family residential property may comprise logic configured to process access credentials presented for authentication. For example, when a resident places a device having the resident's access credential in proximity to a sensor (e.g., a near field communication (NFC) device, a Bluetooth device, etc.) of the smart door lock, access credential may be received by the logic for processing, which may include applying a hash function or other data processing technique. If the processing is successful (e.g., a result of the hash function or other processing technique satisfies a criterion), a lock control mechanism may be engaged, thereby enabling the resident to turn a knob that controls a deadbolt or other form of locking device to either lock or unlock the smart door lock. If the processing is not successful (e.g., the result of the hash function or other processing technique does not satisfy the criterion), the lock control mechanism may not be engaged. When the lock control mechanism is not engaged, the knob that controls the deadbolt may spin freely (or not move at all), thereby preventing the deadbolt from being placed in a locked state or an unlocked state. Additional features provided by the smart door lock in accordance with embodiments are described in more detail below with respect to FIG. 12.

In an embodiment, rather than generating access credentials, the credential management interface 137 may interface (e.g., via a network 150) with a system of a third party service provider (not shown) that is configured to generate access credentials. In such an embodiment, the credential management interface 137 may enable property management personnel and/or a resident to request that an additional access credential, which may be utilized to unlock the smart door lock, be generated by the system of the third party service provider. As a result of the request, the system of the third party service provider may generate the requested access credential (assuming appropriate authentication of the request and/or requestor has been performed). Where the access credential is to be utilized by a user device, such as a smart phone, the system of the third party may provide the newly generated access credential to the user device directly, such as by downloading the access credential to the user device via an access credential management application installed on the user device, or indirectly, such via a message (e.g., a text message, e-mail message, etc.) provided to the user device that includes information that enables the user device to retrieve or otherwise obtain or download the newly generated access credential, or via another technique. In an embodiment, if an access credential that is to be disabled corresponds to an access credential that was generated by the system of the third party and that is stored on the user device, such as a smart phone, the server 130 may be configured to interact with the system of the third party to disable such access credentials, such as by providing information to the user device to disable further use of the access credential. If, however, the access credential is stored on a third party device 160, such as a fob or smartcard, disabling of the access credential may be accomplished via communication of control information to smart hub 110, as will be described in more detail below.

In an embodiment, one or more databases 135 may include a credential database storing information associated with smart door locks installed at the multi-family residential property. When an access credential for a particular smart door lock is to be generated, credential management module 137 may access the credential database to obtain information associated with the particular smart door lock, and then use the obtained information to create access credential. For example, the information stored in access credential database 135 may comprise information that may be used to generate access credentials that, when processed by the logic of the designated smart door lock, produce a successful result. Additionally, when new access credentials are generated, access credential management module 137 may update one or more records stored at the credential database (or another database), such as to record information that identifies the resident or individual access credential was provided to.

The one or more communication interfaces 138 may communicatively couple server 130 to smart hubs deployed within the multi-family residential property, such as smart hub 110, via one or more communication networks. For example, a first communication interface of server 130 may be configured to communicate with smart hub 110 via a communication link 112 over a cellular network or a Long Range (LoRa) wide area network (LoRaWAN), and a second communication interface of server 130 may be configured to communicate with the one or more communication networks via a short-range or non-LoRaWAN communication link, such as an Institute of Electrical and Electronics Engineers (IEEE) 802.11 communication link, an Ethernet communication link, and the like.

In some embodiments, the first communication interface of server 130 may be configured to communicate with smart hub 110 via a cellular communication network, as will be described in further detail below. Accordingly, communication link 112 may be a cellular network connection between remote server 130 and smart hub 110. Examples of such a cellular network include, but are not limited to, a Global System for Mobile Communications (GSM) network, a General Packet Radio Service (GPRS) network, a Code-Division Multiple Access (CDMA) network, a Frequency-Division Multiple Access (FDMA) network, an Orthogonal Frequency-Division Multiple Access (OFDMA) network, and a Space-Division Multiple Access (SDMA) network. Such a cellular network may support any of various cellular communication standards and technologies including, but are not limited to, 3G, 4G, Long Term Evolution (LTE), 5G, and new technologies being developed, such as 6G.

Alternatively, the communication link 112 may be a communication link within a low-power, wide area network (LPWAN) or another type of network topology utilizing low-power or LoRa-based wide area network (LoRaWAN) communication links. For example, in an embodiment, communication link 112 may utilize narrowband-Internet of Things (NB-IoT) communication links, Sigfox-based communication links, Weightless communication links, Long-Term Evolution for Machines (LTE-M) or Long-Term Evolution Type Communication (LTE-MTC) communication links, DASH7 communication links, Wize communication links, chirp spread spectrum (CSS)-based communication links, MIoTy communication links, IEEE 802.11ah communication links, or the like.

In an embodiment, the first communication interface may communicatively couple the server 130 to an appropriate network gateway 136, as shown in FIG. 1. The network gateway 136 may be configured to relay information received from the server 130 to one or more smart hubs using the communication link 112 and to relay information received from one or more smart hubs via the communication link 112 to the server 130. As described above, the communication link 112 in some implementations may be a communication link within a cellular network. In some such implementations, the network gateway 136 may include or be integrated in, or replaced by, one or more other components of a cellular network, such as a base station, a small cell base station, an Evolved Node B (eNB), a Next Generation Node B (gNB), a core network, another component, or a combination thereof.

Smart hub 110 may include a first communication interface and one or more additional communication interfaces. First communication interface may communicatively couple smart hub 110 to server 130 via a communication link 112, e.g., one or more connections over a cellular network or other long-range communication network, and one or more additional communication interfaces may communicatively couple smart hub 110 to one or more smart devices 120 via one or more communication links 114, e.g., one or more connections over a wireless personal area network (WPAN) or other short-range communication network, such as a Wi-Fi communication link, a Zigbee communication link, a Bluetooth communication link (e.g., a standard Bluetooth communication link or a Bluetooth low energy (BLE) communication link), and the like, associated with a unit of the multi-family residential property. As will be described in more detail below, smart hub 110 may be deployed within any designated area or unit of a multi-family residential property, such as an individual apartment or residential unit, or a designated common area, such as a gym, a game room, etc., and may be utilized to facilitate remote access to, and control of, smart devices in proximity to smart hub 110.

Figure 2:
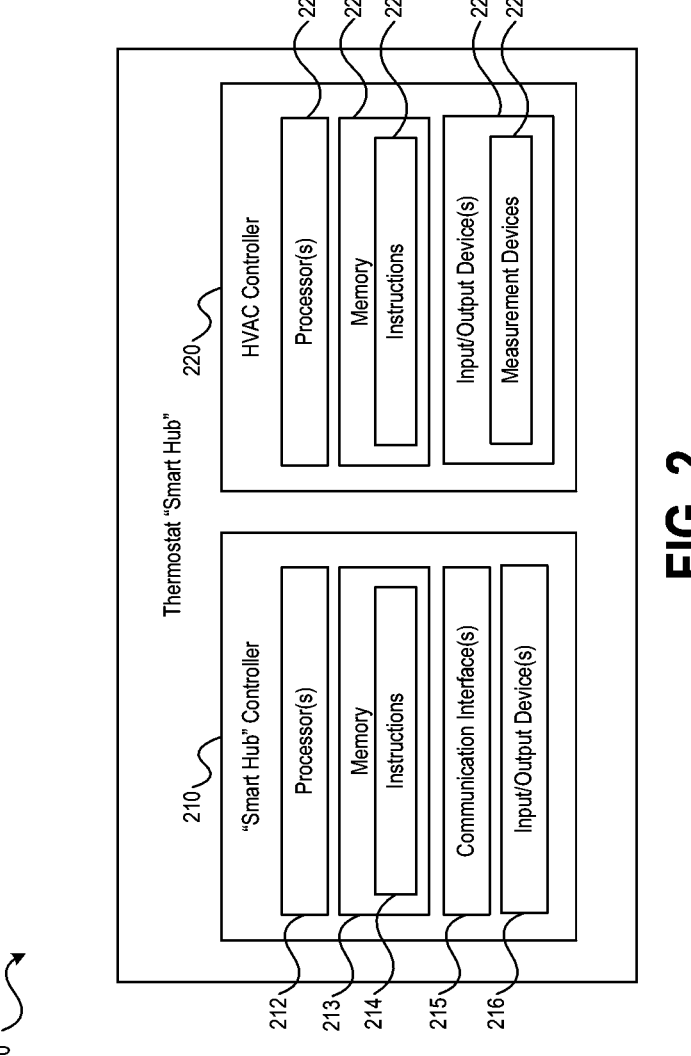
FIG. 2 is a block diagram of a smart thermostat hub in accordance with embodiments of the present disclosure.

In an embodiment, smart hub 110 may be a smart thermostat hub. For example, in FIG. 2, a block diagram of a smart thermostat hub 200 in accordance with embodiments of the present disclosure is shown. As shown in FIG. 2, smart thermostat hub 200 includes a smart hub controller 210 and a heating, ventilation, and air conditioning (HVAC) controller 220. Smart hub controller 210 may include one or more processors 212, a memory 213, communication interfaces 215, and one or more input/output (I/O) devices 216. Memory 213 may include RAM, ROM, one or more HDDs, one or more SSDs, or other types of memory devices for storing data in a persistent or non-persistent state. Memory 213 may store instructions 214 that, when executed by the one or more processors 212, cause the one or more processors 212 to perform operations of smart hub devices described with reference to FIGS. 1-6. As explained with reference to smart hub 110 of FIG. 1, communication interfaces 215 may include a first communication interface configured to communicatively couple smart hub controller 210 to a remote server (e.g., server 130 of FIG. 1) via a cellular network or other long-range communication link (e.g., communication link 112 of FIG. 1) and one or more additional communication interfaces configured to communicatively couple smart hub controller 210 to one or more smart devices (e.g., the one or more smart devices 120 of FIG. 1) via a WPAN or one or more short-range communication links (e.g., communication links 114 of FIG. 1), such as Wi-Fi communication links, Zigbee communication links, a Bluetooth communication links, and the like.

The one or more I/O devices 216 may be configured to facilitate user interaction with smart hub controller 210. For example, a user (e.g., employee, contractor, or agent of the multi-family residential property) may periodically couple an external device (e.g., third party devices 160 of FIG. 1) to smart hub controller 210 to perform software upgrades, diagnostics, etc. It is noted, however, that the communication link between smart hub controller and server may be utilized for these purposes in some embodiments. The one or more I/O devices 216 may include a USB interface, a serial port interface, or other type of wired or wireless interface suitable for exchanging information with, obtaining information from, or providing information to smart hub control 210. Additionally, I/O devices 216 may include a display device, which may provide information regarding an operational status of smart hub controller 210. For example, the display device may present information associated with a status of various communication links between smart hub controller 210 and smart devices and/or the remote server. It is noted that the specific I/O devices described above have been provided for purposes of illustration, rather than by way of limitation and that I/O devices 216 may include other types of I/O devices that facilitate interaction with smart hub controller 210.

As shown in FIG. 2, HVAC controller 220 may include one or more processors 222, a memory 223, and one or more I/O devices 225. Memory 223 may include RAM, ROM, one or more HDDs, one or more SSDs, or other types of memory devices for storing data in a persistent or non-persistent state. Memory 223 may store instructions 224 that, when executed by the one or more processors 222, cause the one or more processors 222 to perform operations for modifying an ambient setting of an environment, such as heating or cooling an apartment of a multi-family residential property to a desired temperature. One or more I/O devices 225 may include buttons, display devices, a touch screen, speakers, microphones, and/or other devices that facilitate interaction with HVAC controller 220. For example, a user may interact with the one or more I/O devices 225 to adjust a temperature of the thermostat. In response to such interaction, HVAC controller 220 may initiate operations to heat or cool an ambient environment specified by the user interaction. As shown in FIG. 2, one or more I/O devices 225 may also include measurement devices 226, such as a temperature sensor, which may be used to determine whether the temperature of the ambient environment is within a threshold tolerance (e.g., 0.5 degree, 1 degree, 2 degrees, etc.) of the target temperature specified by the user interaction. It should be appreciated that measurement devices 226 may include any number of sensors or devices for measuring and recording any of various types of measurements, as desired for a particular implementation.

Figure 3:
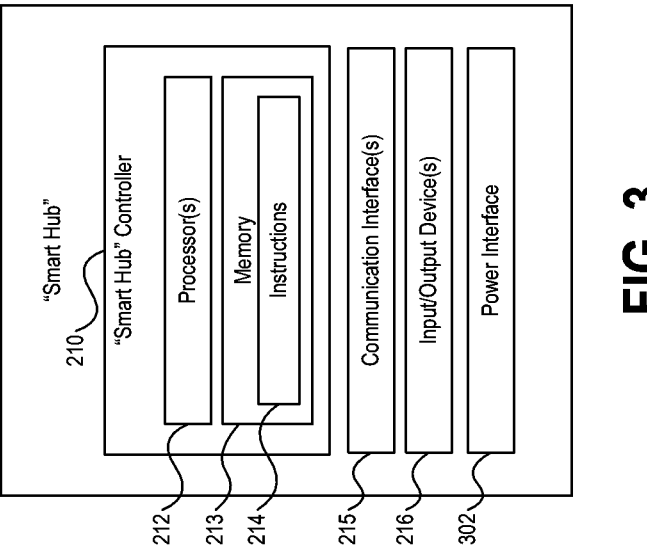
FIG. 3 is a block diagram of another smart hub in accordance with embodiments of the present disclosure.

Referring to FIG. 3, a block diagram of another smart hub in accordance with embodiments of the present disclosure is shown as a smart hub 300. As shown in FIG. 3, smart hub 300 includes smart hub controller 210, one or more processors 212, memory 213, instructions 214, communication interfaces 215, and I/O devices 216 described above with reference to FIG. 2. However, smart hub 300 of FIG. 3 also includes power interface 302. Power interface 302 may comprise one or more components (e.g., a plug configured to interface with a power outlet, a power coupling configured to couple smart hub 300 to a power source via electrical wiring of a structure, a battery interface, and the like) configured to provide operational power to smart hub 300. Therefore, as compared to smart thermostat hub 200 of FIG. 2, smart hub 300 of FIG. 3 illustrates an embodiment of smart hub as standalone device.

It is noted that, as compared to smart hub 300 of FIG. 3, smart thermostat hub 200 of FIG. 2 may provide several advantages for multi-family residential properties, such as Class B and C properties in particular. For example, a common problem when deploying new technologies in Class B and C properties is the lack of necessary infrastructure needed to support the new technology. To install the standalone smart hub illustrated in FIG. 3, an electrician would need to find or create a suitable source for tapping into existing electrical wiring of an apartment in order to hard wire smart hub 300 into the apartment's electrical power infrastructure. This may include hardwiring smart hub 300 to electrical wiring of a power outlet, which would result in loss of an existing power outlet of the apartment. Alternatively, an electrician may install smart hub 300 on a wall of the apartment by tapping into or splicing the existing electrical wiring of the apartment, but this option would create a significant cost if performed for many apartments of a multi-family residential property. An additional option would be to plug smart hub 300 into an electrical outlet of the apartment. This option may be problematic as the resident could easily unplug smart hub 300 from the electrical outlet, thereby preventing operation of smart hub 300 and the various features it provides with respect to certain smart devices of the apartment, such as managing and controlling a smart door lock and enhanced property management functionalities (e.g., controlling a thermostat, light fixtures, etc.).

In contrast, smart thermostat hub 200 of FIG. 2 is designed to be installed as a replacement to existing thermostats that may be present in a multi-family residential property. Even for Class B and Class C residential properties, the existing thermostats would be coupled to existing electrical wiring of the structure thereby enabling installation of smart thermostat hub 200 by simply removing the existing thermostat and coupling smart thermostat hub 200 to the existing electrical wiring. For example, smart thermostat hub 200 of FIG. 2 may include a power interface that is configured to be coupled to electrical wiring of a unit using a same configuration as conventional thermostats. Such an installation can be performed with minimal effort and cost (e.g., by decoupling the existing thermostat from the electrical wiring and coupling smart thermostat hub 200 in place of the existing thermostat), thereby significantly reducing the cost to deploy smart thermostat hubs in a multi-family residential property. For example, maintenance personnel may install smart thermostat hub 200 without additional splicing or tapping into the electrical wiring of the unit, and smart thermostat hub 200 may be installed without having to plug smart thermostat hub 200 into a power outlet, thereby reducing a likelihood that a resident would remove smart thermostat hub 200, and without hardwiring smart thermostat hub 200 to the power outlet, thereby preserving the power outlet for use by the resident. Additionally, because smart thermostat hub 200 may be enclosed within a single housing, the likelihood that a resident would tamper with or remove smart thermostat hub 200, and thereby inhibit the benefits that smart thermostat hub 200 provides with respect to security and property management functionality would be minimized. A further advantage of smart thermostat hub 200 is that thermostats may be centrally located within a structure for which they provide control of an HVAC system, such as a central location within an apartment of a multi-family residential property. This may be advantageous as it enables smart hub functionality to be centralized with respect to the apartment, thereby increasing the likelihood that the smart hub's one or more second communication interfaces (e.g., communication interfaces for interacting with smart devices), which may utilize communication links having short range communication capabilities, are within communication range of smart devices present in the apartment, such as a smart door lock.

Figure 4:
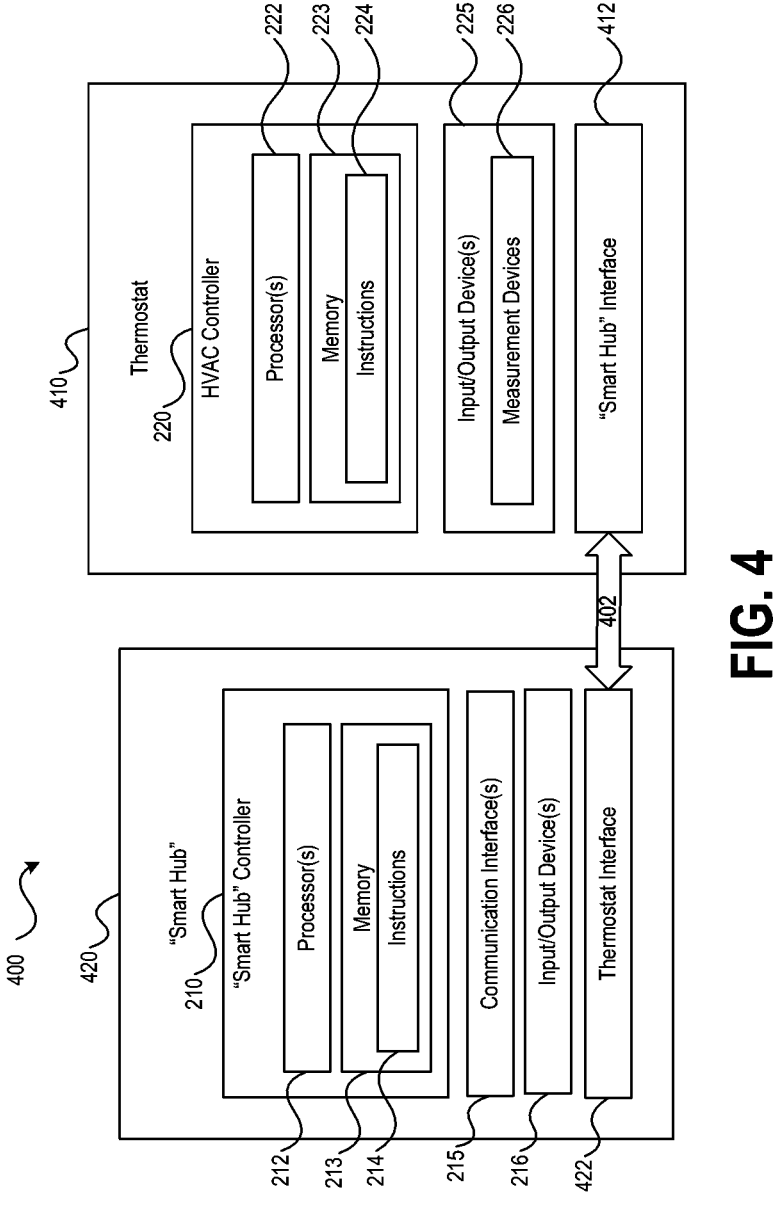
FIG. 4 is a block diagram of a modular smart thermostat hub in accordance with embodiments of the present disclosure.

Referring to FIG. 4, a block diagram of a modular smart thermostat hub in accordance with embodiments of the present disclosure is shown as modular smart thermostat hub 400. As shown in FIG. 4, the modular smart thermostat hub may comprise a thermostat component 410 and a smart hub component 420. Thermostat component 410 may comprise the components of smart thermostat hub 200 that provide control over an HVAC system of a structure, such as HVAC controller 220 (including the one or more processors 222 and memory 223 storing instructions 224) and I/O devices 225 (including the measurement devices 226). Smart hub component 420 may include components of smart thermostat hub 200 of FIG. 2 and/or smart hub 300 of FIG. 3 that provide the above-described improvements with respect to security and property management through utilization of smart devices, such as a smart door lock, a thermostat, lights fixtures, and the like. For example, as illustrated in FIG. 4, smart hub component 420 may comprise smart hub controller 210 (including the one or more processors 212 and memory 213 storing instructions 214), communication interfaces 215, and I/O devices 216.

Additionally, thermostat component 410 may comprise a smart hub interface 412 and smart hub component 420 may comprise a thermostat interface 422. The modular smart thermostat hub 400 may be formed by coupling smart hub interface 412 and the thermostat interface 422, as shown at arrow 402. For example, smart hub interface 412 may comprise one or more pins and the thermostat interface 422 may comprise a connector configured to couple the one or more pins of smart hub interface 412. Alternatively, the thermostat interface 422 may comprise one or more pins and smart hub interface 412 may comprise a connector configured to couple the one or more pins of the thermostat interface 422. It is noted that although smart hub interface 412 and the thermostat interface 422 have been described as being coupled via one or more pins and a connector, this exemplary technique for interfacing smart hub component 420 and thermostat component 410 has been provided for purposes of illustration, rather than by way of limitation and that other techniques and components may be used to couple smart hub component 420 and thermostat component 410.

As shown above, the modular smart thermostat hub 400 may comprise separate components (e.g., thermostat component 410 and smart hub component 420) that, when coupled, facilitate the operations for providing the enhanced security features for managing and securing smart door locks and the improved property management functionality, as described herein. The modular design of the modular smart thermostat hub 400 may provide various advantages over smart thermostat hub 200 and smart hub 300 described above. For example, due to the modular design, a multi-family residential property may be incrementally upgraded to provide the various features described herein, such as installing thermostat component 410 at a first point in time and then installing smart hub component 420 at a second point in time that is later than the first point in time. This may allow a multi-family residential property to be upgraded over time using components (e.g., thermostat component 410 and smart hub component 420) that may be cheaper (individually) than smart thermostat hub 200, enabling the upgrades to be performed as a budget of the multi-family residential facility allows. The modular smart thermostat hub may also provide additional advantages regardless of whether the components (e.g., thermostat component 410 and smart hub component 420) of the modular smart thermostat hub are installed at the same point in time or at different points in time. For example, if thermostat component 410 of the modular smart thermostat hub 400 fails, thermostat component 410 may be replaced without replacing smart hub component 420 and if smart hub component 420 of the modular smart thermostat hub 400 fails, smart hub component 420 may be replaced without replacing thermostat component 410. Therefore, the cost of maintaining the modular smart thermostat hub 400 in an operational state over time may be less than smart thermostat hub 200 of FIG. 2. It is noted that the components of the modular smart thermostat hub 400 may be provided within a single housing. For example, thermostat component 410 may comprise a housing that includes a cavity or space within which smart hub component 420 may be provided. The cavity or space within the housing may be accessible through an access panel of the housing.

It is noted that each of the different smart hub configurations illustrated in FIGS. 2-4, which are configured to utilize cellular or other long-range communication links (e.g., communication link 112 of FIG. 1), provide the additional advantage of not requiring network infrastructure, such as a Wi-Fi network, to be deployed in concert with the deployment of the smart hub devices in order to facilitate operations in accordance with embodiments of the present disclosure. This significantly reduces the costs to deploy the smart hubs in a multi-family residential property. However, it is noted that even in situations where such network infrastructure is present, the smart hubs illustrated in FIGS. 2-4 still provide certain advantages, as will be described in more detail below with reference to FIG. 7.

Referring back to FIG. 1, during operation of system 100, residents of a multi-family residential property may be provided with access credentials, as described with reference to credential management module 137. Access credentials may be provided to the residents via user devices 140 or third party devices 160. Exemplary user devices 140 may include a resident's smartphone, tablet computing device, smartwatch, or other electronic devices having appropriate functionality for interacting with a smart door lock and other smart devices, such as functionality enabling communication via NFC, Bluetooth, Zigbee, Zwave, and the like. Exemplary third party devices 160 may include fobs or smartcards provided by the multi-family residential property, such as by an employee or property manager associated with the multi-family residential facility.

In an embodiment, access credentials may also be provided to the user devices 140 via a cloud-based service 152 accessible via network 150, such as the Internet. For example, a property management entity associated with a multi-family residential facility may provide a website and/or mobile application that residents may utilize to obtain access credentials. The website and/or the mobile application may enable residents to interact with the cloud-based service 152 to request access credentials and perform various tasks relating to the current operating status or settings of each smart device, as will be described in further detail below. In some embodiments, a resident may interact with the website and/or mobile application via a graphical user interface (GUI) provided at the resident's mobile device (e.g., user device 140) to access and control various features of the various smart devices installed at the resident's apartment unit or at a designated common area within the multi-family residential property. An example of such a GUI will be described in further detail below with respect to FIG. 15. The cloud-based service 152 may be configured to generate access credentials in a manner similar to the techniques described above with respect to credential management module 137 of server 130. For example, after authenticating a resident, the cloud-based service 152 may generate an access credential based on information stored in a database, such as the credential database described above. Once generated, the cloud-based service 152 may provide access credential to the resident's user device.

As described above, generation of credentials may not require interaction with a smart door lock. Instead, access credential may be generated such that when access credential is presented to the smart door lock (e.g., via placing a device loaded with access credential in proximity to the smart door lock), a result (e.g., a hash value or other information) generated by the credential processing logic of the smart door satisfies an access authorization criterion. The access authorization criterion may comprise a pre-determined value (e.g., a pre-determined hash value or other information) or may comprise a range of pre-determined values. Utilizing access authorization criteria comprised of a range of pre-determined values may facilitate various advantageous features of system 100.

For example, as access credentials are generated, by either the cloud-based service 152 or credential management module 137, each access credential may be configured to result in a different value within the pre-determined range of values of the corresponding smart door lock, and information that identifies each individual to which an access credential is provided may be recorded (e.g., at the credentials database or another database). The smart door lock may comprise a memory configured to log information associated with each access credential presented to the smart door lock, such as the result generated by the processing logic of the smart door lock in response to presentation of an access credential and timestamp information associated with a time when access credential was presented. The logged information may also include information associated with a state of the smart door lock at the time access credential is present. For example, the state of the smart door lock may be configurable to change between a locked state and an unlocked state, as described above. Each time the state of the smart door lock changes, information indicating the current state of the smart door lock and the time of the state change may be recorded in memory of the smart door lock.

The log of information recorded by the smart door lock may be subsequently retrieved to audit access of the smart door lock. To illustrate, smart hub 110 may be configured to periodically generate and transmit an audit log request that may be transmitted to the smart door lock via a communication link provided by the one or more second communication interfaces of smart hub 110. In response to the request, the smart door lock may transmit the log of information to smart hub 110 via the communication link. Upon receiving the log of information, smart hub 110 may transmit the log of information to server 130 via a first communication link provided by the first communication interface (e.g., a cellular network interface), and server 130 may store the log of information in the one or more database 135, such as at an access audit log database. In some embodiments, smart hub 110 may be configured to transmit the log of information to server 130 according to scheduling information provided by server 130 via a cellular network. For example, the data transmission bandwidth provided by cellular communication links in some cases may be lower than other types of wireless communication links, such as Wi-Fi, and therefore, transmission of the log of information may take appreciable time. By scheduling transmission of the log of information to server 130 at specific times, which may correspond to off-peak hours (e.g., overnight), interference with other smart hubs of a multi-family residential property may be minimized, which may ensure more reliable communication with smart hubs of the multi-family residential property in an emergency or priority situation, such as if a credential for a smart door lock needs to be disabled.

Additionally or alternatively, server 130 may transmit control information to smart hub 110, where the control information comprises information that identifies the smart door lock and instructs smart hub 110 to obtain at least a portion of the log of information (e.g., information associated with all access credentials presented to the smart door lock, invalid (denied) access credentials presented to the smart door lock, valid access credentials presented to the smart door lock; information associated with changes in the state (actuation events) of the smart door lock; a current state of the smart door lock; and the like), where the portion of the log of information may be specified temporally (e.g., a portion of the log information corresponding to a particular period of time, such as a specified hour, range of hours, day, number of days, a week, and the like), by event type (e.g., state changes, received valid and/or invalid access credentials, disablement of access credentials, authorization of new access credentials, and the like), or both temporally and by event type (e.g., occurrences of one or more particular event types during one or more defined periods of time). It is noted that temporal portions of the retrieved log information may include consecutive time units, such as portions of the log information captured during a consecutive number of hours, days, weeks, and the like. Additionally, the temporal portions of the retrieved log information may include disjoint time units, such as portions of the log information captured on a first day in a week and a third day of the week, a first number of hours in the morning of a particular day and a second number of hours during the evening of the particular day or another day, and the like. The retrieved access log information may include information that identifies particular access credentials associated with the retrieved portion(s) of the information logged by the smart door lock. The ability to probe the smart door lock via control information transmitted by server 130 may improve the security of a multi-family residential property. For example, if a resident is unsure of whether his/her apartment was locked when they left, the resident may contact property management personnel to inquire about the status of the smart door lock, and the property management personnel may utilize a property management platform provided by server 130 to transmit control information to smart hub 110 associated with the resident's apartment. In this example, the control information may identify the smart door lock associated with the resident's apartment and may specify that smart hub 110 is to retrieve only the current status of the smart door lock (e.g., whether the smart door lock is in the locked state or the unlocked state), rather than the entire log of information stored at memory of the smart door lock. By only retrieving the current state of the smart door lock, the requested information may be returned to server 130 more quickly. If the status of the smart door lock is determined to be unlocked, the property management personnel may visit the resident's apartment and secure the smart door lock (e.g., place the smart door lock in the locked state).

In an embodiment, a resident may initiate a status check of the smart door lock via cloud-based service 152. For example, as described above, the resident may access a website or a mobile application via a graphical user interface at the resident's mobile device (e.g., user device 140) that facilitates interaction with the cloud-based service 152. The graphical user interface may provide functionality that enables the resident to view the log of information associated with the smart door lock of the resident's apartment, as well as initiate a status check request to determine a current state of the smart door lock. When a status check request is initiated via the graphical user interface provided by the website or mobile application, the cloud-based service 152 may initiate transmission of a status check request message to server 130 via the network 150. The status check request message may include information identifying the smart door lock for which the status check has been request, such as information that identifies the resident, the resident's apartment number, a smart door lock identifier corresponding to the smart door lock of the resident's apartment, or other information that may be used to identify smart hub located at the resident's apartment. Upon receiving the status check request message, server 130 may obtain information indicating the current status of the smart door lock of the resident's apartment by transmitting control information to smart hub located at the resident's apartment via a cellular network or cellular communication link, as described above.

Upon receiving the status information from smart hub, server 130 may provide the status information to the cloud-based service 152, which may present information associated with the current status of the smart door lock to the resident via the graphical user interface. The status information may be provided from server 130 to the cloud-based service 152 in a variety of ways. For example, server 130 may store the status information at the access audit log database and then transmit a message to the cloud-based service 152 that indicates the status check request is complete. The cloud-based service 152 may then retrieve the status information from the access audit log database for presentation to the resident via the graphical user interface. Additionally or alternatively, server 130 may include information that indicates the current status of the smart door lock in the response message, which eliminates the need for the cloud-based service 152 to access the access audit log database.

If the status of the smart door lock is determined to be unlocked, the resident may contact property management personnel to request that they visit the resident's apartment and secure the smart door lock (e.g., place the smart door lock in the locked state). The resident may contact the property management personnel to request that the resident's smart door lock be secured via a phone call, a text message (e.g., a text message sent to a number associated with the multi-family residential property for reporting maintenance requests, door security verification requests, and the like), an e-mail message, an instant message (e.g., an instant message created using functionality of the graphical user interface) provided to a device associated with property management personnel, or another method. In an embodiment, a confirmation notification may be provided to the resident once the smart door lock has been secured by the property management personnel.

It is noted that smart hub 110 may also be configured to maintain one or more activity logs, which may be periodically retrieved, in whole or in part, via communication link 112 and network gateway 136 by server 130 or the property management platform provided thereby. Such activity logs may include information associated with various smart devices, such as information that provides historical information associated with how a resident's thermostat is configured (e.g., preferred temperatures, etc.), whether various smart devices, such as lights, were left on for prolonged periods of time, etc. Such information may provide insights into the preferences of the residents of a multi-family residential property, which may be used to automatically customize other experiences of the resident. For example, a resident may gain access to a common area of the multi-family residential property, such as a gym, game room, a media room, and the like, by presenting the resident's access credential. Such access may be detected (e.g., via periodic probing of smart door locks associated with common areas of the multi-family residential property by one or more smart hubs associated with the common areas or via automatic transmission of access information to the one or more smart hubs by the smart door lock via a short-range or WPAN communication link) and utilized to configure the particular area to perceived preferences of the resident (e.g., a preferred temperature, etc.), where the perceived preferences are derived from the activity log maintained by the smart hub associated with the resident's apartment.

Additionally or alternatively, the resident (e.g., via user device 140) or a property manager (e.g., via server 130) may control one or more settings of the smart devices installed in a common area due at least in part to cellular network connections between user device 140/server 130 and smart hub 110. As described above, smart hub 110 may be deployed within the common area to facilitate remote access to, and control of, the smart devices in proximity to smart hub 110 via a WPAN or other short-range communication network (e.g., a Wi-Fi, Zigbee, or Bluetooth network) associated with the common area. For example, a resident wishing to gain entry to the common area may interact with a graphical user interface of a mobile application executing at user device 140 to send an unlock command or instruction via a cellular network connection to smart hub 110 for unlocking a smart door lock installed at the common area. The resident may also use the mobile application to send additional commands via the cellular network connection to smart hub 110 for other smart devices within the common area, e.g., commands for turning on smart lights or operating a smart television within the common area. Likewise, a property manager in this example may use a cellular network connection between server 130 and smart hub 110 to monitor and control various aspects of the common area, such as locking smart door locks, dimming or turning off the smart lights, and controlling the temperature settings of a smart thermostat either after hours or at scheduled times throughout the day.

As briefly described above, server 130 may provide a property management platform that may be utilized to manage various aspects of a multi-family residential property. The property management platform may provide one or more graphical user interfaces that facilitate interaction with smart hubs installed at apartments of the multi-family residential property. To illustrate, the property management platform (e.g., server 130 or a cloud-based implementation of the functionality provided by server 130) may provide a graphical user interface that enables access credentials associated with a smart door lock to be disabled remotely. Via this graphical user interface, a property management user may view access credentials authorized for a particular smart door lock and select one or more access credentials that are to be disabled. Upon confirming which access credential(s) is to be disabled, server 130 may identify one or more smart hubs of the multi-family residential property associated with smart door locks for which the access credential(s) has been authorized (e.g., may be used to lock or unlock the smart door lock(s)), and may transmit control information to the identified smart hubs. For each of the identified smart hubs, the control information may identify the smart door lock and the access credential(s) that is to be disabled for the identified smart door lock.

As explained above, control information provided to a smart hub may include information that identifies one or more smart devices to which the control information pertains and information associated with one or more actions or parameters for modifying a configuration of the one or more smart devices. Continuing with this example, upon receiving the control information from server 130, smart hub(s) may identify one or more smart devices (e.g., one or more smart door locks) and may derive one or more commands for controlling the one or more identified smart devices in accordance with the control information, such as commands to disable access credentials specified in the control information at the identified smart door lock. Having determined the one or more smart devices to which the received control information pertains and deriving appropriate commands for controlling the one or more smart devices in accordance with the control information, smart hub(s) may initiate transmission of the derived commands to the smart devices via one or more second communication links provided by a second communication interface (e.g., a short-range or WPAN communication interface), and the smart devices may execute the commands. For example, upon receiving the commands, a smart door lock may disable the identified access credentials. In an embodiment, the smart door lock may disable an access credential by configuring a flag associated with the access authorization criteria used by the processing logic of the smart door lock to authenticate presented access credentials. A first value of the flag may indicate access credential is authorized to configure the smart door lock to the locked state and the unlocked state and a second flag value may indicate that access credential has been disabled. Once disabled, access credential may not be used to configure the smart door lock to the unlocked state or the locked state. In an embodiment, smart door locks may comprise an automatic locking mechanism that automatically configures the smart door lock to the locked state when a disable access credential is present. This may further enhance security since a smart lock that is in the unlocked state may be automatically transitioned to the locked state when a disable access credential is presented.

In addition to remotely disabling access credentials, property management personnel may manually disable access credentials associated with smart door locks of system 100, such as by coupling an external device (e.g., a laptop computing device, a tablet computing device, etc.) to the smart door lock and then using an application or utility provided by the external device to manage access credentials. In an embodiment, server 130 may be configured such that access credentials that have been disabled may not be re-enabled via smart hub 110. In this embodiment, a disable access credential may only be re-enabled by coupling the external device to the smart door lock, as described above. In an embodiment, disable access credentials may be re-enabled via control information provided to smart hub 110 by server 130. However, if such capability is provided, system 100 may be configured to require one or more users to authorize the re-enablement of access credential. For example, a manager, supervisor, or other member of property management personnel may need to provide a password in order to re-enable access credential via server 130 and smart hub 110. As another example, remotely re-enabling an access credential via server 130 and smart hub 110 may require authorization from a member of the property management personnel and the resident associated with the smart door lock where access credential is disabled. Requiring the resident to participate in the authorization to remotely enable an access credential may prevent a nefarious individual from gaining entry into the resident's apartment.

In an embodiment, access credentials may also be created (e.g., by either the credential management interface 137 or the system of the third party) that comprise information designed to disable another access credential when used. For example, suppose that a first access credential is to be disabled. A second access credential may be generated and configured to include information that is configured to disable the first access credential when the second access credential is presented to a particular smart door lock. The information for disabling the first access credential may include information that identifies the first access credential and other information that specifies an operation associated with the first access credential, such as to disable the first access credential. When the second access credential is presented to the smart door lock, the information for disabling the first access credential may be detected by the smart door lock in addition to detecting the second access credential, thereby enabling the second access credential to be used to change a stat of the smart door lock while also disabling the first access credential. It is noted that such techniques may be utilized to disable multiple access credentials, rather than a single access credential, and may also be utilized to disable one or more access credentials at multiple different smart door locks (e.g., by presenting the second access credential carrying the information for disabling the first access credential at multiple smart door locks where the first access credential has been previously authorized for use). Additionally, access credentials carrying information configured to disable one or more other access credentials may be presented to smart door locks via a user device (e.g., a smartphone, etc.) or via a third party device (e.g., a fob, a smartcard, etc.).

In addition to providing functionality for managing access credential, the property management platform provided by server 130 may also provide graphical user interfaces and features that facilitate intelligent management of a multi-family residential property. For example, the one or more database 135 may include a resident database that includes information associated with vacant apartments of the multi-family residential property, move-in dates associated with new residents, and move-out dates associated with departing residents. The property management platform may utilize this information to control and automate various property management tasks. For example, the property management platform may periodically (e.g., daily, weekly, monthly, etc.) analyze the resident databased to identify move out dates. When a move out date occurs, the property management platform may transmit control information to a smart hub 110 of the vacated apartment via the first communication link (e.g., a cellular communication link) to place various smart devices of the apartment into a vacant mode. To illustrate, the control information may identify the thermostat (e.g., the thermostat of smart thermostat hub 200 of FIG. 2 or thermostat component 410 of FIG. 4) of the vacated apartment and may include parameters specifying a temperature that the thermostat should be configured to while vacant. Smart hub 110 may receive the control information, detect that the control information is associated with the thermostat (e.g., based on device identification information included in the control information, and transmit one or more commands to the thermostat via the second communication link (e.g., a WPAN communication link) to modify one or more operational settings of the thermostat in accordance with the control information. The one or more operational settings control at least one of a temperature setting of the thermostat and an operating mode of the thermostat, the operating mode configurable to change between a heating mode, a cooling mode, and an off mode (e.g., to turn the thermostat off).

In an embodiment, the control information may include scheduling information that specifies periods of time during which the thermostat is to be placed in a particular operating mode. For example, the thermostat scheduling information may specify first information that specifies the thermostat is to be configured to a first operating mode (e.g., the heating mode, the cooling mode, or the off mode) for a first period of time and second information that specifies the thermostat is to be configured to a second operating mode (e.g., the heating mode, the cooling mode, or the off mode) that is different from the first operating mode for a second period of time. The first information may be utilized to at least partially heat the vacant apartment during at least a portion of the night during winter months or cool the apartment during at least apportion of the day during summer months. The particular temperatures associated with the first information and the second information may be determined to mitigate potential damage caused by seasonal temperatures, such as to prevent freezing of water pipes, etc. or prevent damage to paint or other potentially heat sensitive surfaces of the apartment. The second information may configure the thermostat to the off mode to minimize the operating costs associated with the vacant apartment. In an embodiment, the thermostat scheduling information may be dynamically generated. For example, the property management platform may be configured to receive weather data (e.g., via an RSS feed or from another third party source of weather information), and may generate commands to control the configuration of the thermostat based on the weather information, such as to place the thermostat in the heating mode if the weather data indicates severely cold temperatures are expected. As the weather data changes, updates thermostat configuration information may be generated and provided to the thermostat via the smart hub 110, as described herein.

As another example, the control information may identify one or more smart light fixtures of the vacated apartment and may include information that indicates the light fixtures are to be turned off. Smart hub 110 may receive the control information, detect that the control information is associated with the one or more smart light fixtures, and transmit one or more commands to the one or more smart light fixtures via the second communication link (e.g., the WPAN communication link) to turn the one or more smart light fixtures off. Alternatively, the control information may specify that one or more of the smart light fixtures of the vacant apartment are to be, at least periodically, turned on. In such instances, smart hub 110 may transmit additional commands to turn on any smart light fixtures based on the control information, which may include scheduling information that indicates times and dates for turning each applicable light fixture on and/or off.

By using server 130 and smart hub 110 to place vacated apartments into the vacant mode, operating costs associated with the multi-family residential property may be significantly reduced. For example, if a thermostat in a vacated apartment is configured to cool the vacated apartment to a low temperature, the thermostat may remain configured in that state until a new resident moves into the apartment. Operating an HVAC system to cool a vacant apartment for a potentially long period of time may result in significant costs, which are avoided using the above-described techniques.

To illustrate, suppose that a resident prefers a "cold" apartment and configures the thermostat to maintain the apartment at a particular temperature (e.g., <75° F.). If, during a walkthrough performed in connection with the resident vacating the apartment, the thermostat setting is not noticed, the apartment may continue to be cooled in accordance with the settings configured by the resident, thus maintaining the now vacated apartment at the temperature preferred by the former resident. This may cause the property owner (or property management company) to incur significant unnecessary costs associated with cooling a vacant apartment. However, as described herein, a property management platform in accordance with embodiments of the present disclosure may automatically detect (e.g., based on information stored in the one or more databases 135) the apartment has been vacated and via the smart hub 110, may configured the thermostat to the vacant mode, which configures the thermostat's temperature setting to maintain the vacant apartment at a temperature specified by the property management company. This temperature may be higher than temperatures typically configured by residents, such as 80° F. Thus, while the apartment is vacant, the thermostat may maintain the apartment at a higher temperature, resulting in reduced costs during the duration of the vacancy. In an embodiment, the vacant mode may further be configured to turn the thermostat off, at least periodically, such that the HVAC system is not operated at all, which may further reduce the costs associated with the vacant apartment.

Similarly, the above-described techniques for placing a vacant apartment into vacant mode may also eliminate costs associated with light fixtures being allowed to remain on in a vacant apartment. It is noted that in addition to facilitating control of smart devices within apartments of a multi-family residential property, the property management platform may also be utilized to control smart devices associated with public areas of a multi-family residential property, such as gyms, conference rooms, game rooms, parking lots/garages, walking paths, and other common spaces maintained by the property management personnel. For example, the above-described techniques may be utilized to transmit control information to smart hubs communicatively coupled to smart light fixtures and/or thermostats associated with such areas of the multi-family residential property to minimize power consumption and associated costs, such as turning the smart light fixtures off at a particular time (e.g., when a common space is deemed closed), turning the smart light fixtures on at a particular time, such as to light up pathways at night, or increasing the temperature of thermostats at a particular time (e.g., when the leasing office or other area is closed). Further, the property management platform may utilize the above-described techniques to verify whether any smart door locks associated with the areas of the multi-family residential property maintained by the property management personnel were left unlocked, and transmit a notification to a member of the property management if any smart door locks are detected to be in the unlocked state, such as a smart door lock associated with the leasing office.

From the foregoing, it is to be appreciated that the various devices illustrated in FIG. 1, as well as they features they provide, represent a significant improvement to technologies for managing aspects of a multi-family residential property through control of smart devices located within multiple areas of the property. For example, system 100 utilizes cellular communication links to provide backhaul communication between a central location, such as a leasing office or a remote property management platform at a server located away from the property, and smart hubs located at the various apartments (e.g., units) or common areas of the multi-family residential property. In contrast with conventional property management solutions, system 100 uses a hybrid approach that leverages different types of communication networks for controlling the smart devices at various locations of the multi-family residential property via a mesh network of smart hubs, where at least one of the smart hubs serves as a cellular backhaul for communications with the remote property management platform. The mesh network may be, for example, a wireless ad-hoc network that enables short-range device-to-device communications between smart hubs associated with different units of the multi-family residential property without requiring a traditional Wi-Fi network infrastructure to be deployed throughout the property. This significantly reduces the costs associated with deploying an intelligent property management system, such as system 100 described above, and makes it feasible to deploy intelligent property management systems in certain types of multi-family residential properties, such as Class B and Class C properties, for which previous technologies requiring a single mesh or Wi-Fi network that provides Internet connectivity across an entire multi-family residential property were cost prohibitive. Cost-savings may also be realized by limiting the cellular backhaul to only one or a limited number of the smart hubs located throughout the property. System 100 also provides features that improve the security of multi-family residential properties, such as by enabling credentials for smart door locks to be remotely disabled via smart hub 110 and allowing smart door locks to be probed for information associated with a state of the smart door lock or to obtain access log information. Additionally, system 100 provides features that improve property management capabilities, such as by automatically placing vacant apartments into a vacant mode designed to improve the energy efficiency and reduce the operating costs of the multi-family residential property.

Figure 5:
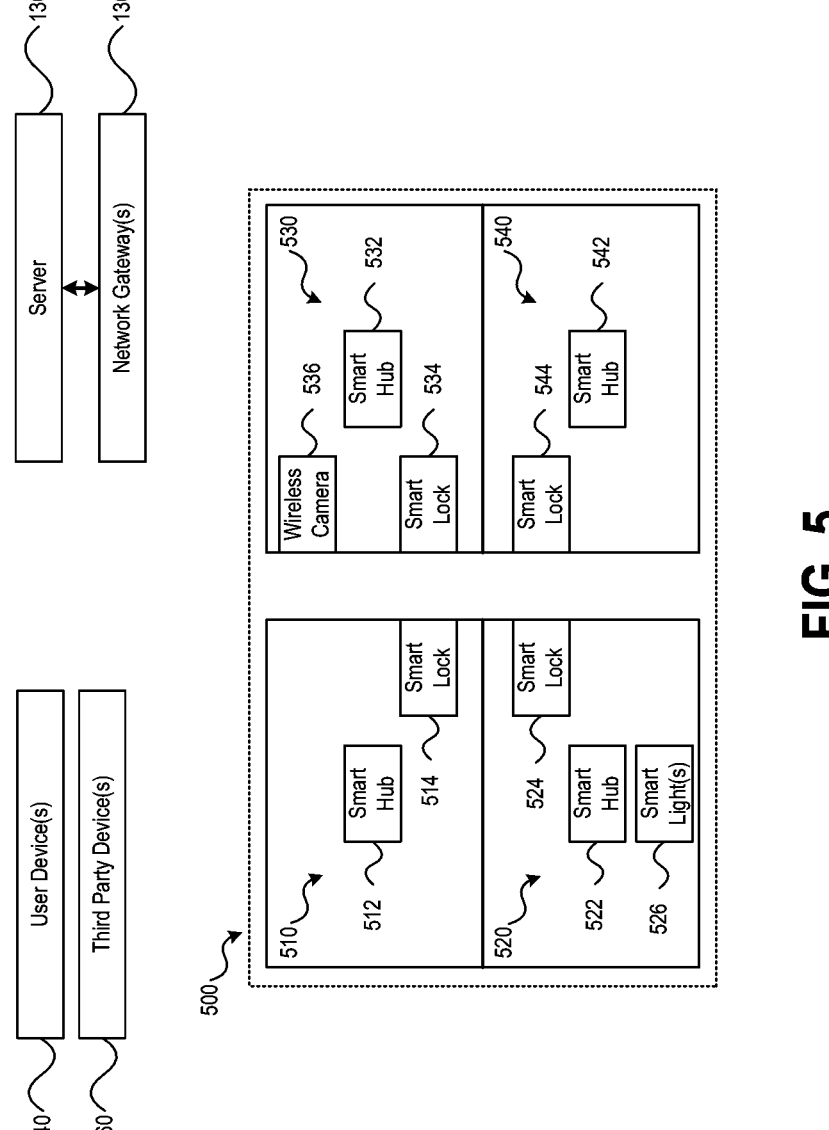
FIG. 5 is a block diagram illustrating aspects of an intelligent property management system configured in accordance with embodiments of the present disclosure.

Referring to FIG. 5, a block diagram illustrating aspects of an intelligent property management system configured in accordance with embodiments of the present disclosure is shown. As shown in FIG. 5, a building 500 of a multi-family residential property may include a plurality of apartments (or residential units) 510, 520, 530, 540. The apartments 510, 520, 530, 540 may include smart hubs 512, 522, 532, 542, respectively, which may comprise smart thermostat hub 200 of FIG. 2, smart hub 300 of FIG. 3, or the modular smart thermostat hub 400 of FIG. 4. Additionally, each of the apartments 510, 520, 530, 540 may include a smart door lock, illustrated in FIG. 5 as smart door locks 514, 524, 534, 544. Each of smart hubs 512, 522, 532, 542 may communicate with server 130 via a first communication link (e.g., a cellular communication link) and may communicate with one or more smart devices, such as thermostat or the smart door locks 514, 524, 534, 544, via a second communication link (e.g., a WPAN communication link).

As described above, smart hubs 512, 522, 532, 542 may be utilized to control various smart devices (e.g., smart door locks 514, 524, 534, 544) present within the respective apartments of the building 500. For example, suppose that a resident of the apartment 510 left for work and was not sure whether he locked the smart door lock 514 on his way out. As described above with reference to FIG. 1, the resident may utilize a user device 140, such as a smartphone, to access a cloud-based service (e.g., the cloud-based service 152 of FIG. 1) hosted by server 130 to obtain the current status of the smart door lock 514. If the resident discovers that he did forget to lock the smart door lock 514, the resident may request that property management personnel visit the apartment 510 and secure (e.g., lock) the smart door lock 514. Once secured, the resident may be notified. Alternatively, the resident may use an application executed by the user device 140 to obtain the current status of the smart door lock 514 and to send a command, via a cellular communication link between the user device 140 and the smart hub 512, to transition the smart door lock 514 into a locked state. An example of a GUI of such an application is described in further detail below with reference to FIG. 15.

As another example, suppose that two residents live in apartment 530 and each of the residents have an access credential loaded onto a third party device 160, such as a fob or smartcard. If one of the residents living in apartment 530 becomes violent toward the other resident, it may be necessary to prevent the aggressor resident from gaining access to apartment 530. As described above, previous systems that utilized smart door locks would require property management personnel to physically visit the apartment 530 and connect an external device to the smart door lock 534 in order to disable the aggressors access credential. Depending on the urgency with which the credential needs to be disabled, the property management personnel may not arrive in time to prevent the aggressor resident from gaining entry to the apartment 530 and causing harm to the other resident. However, utilizing the property management platform provided by server 130, property management personnel may remotely disable the aggressor resident's access credential by transmitting control information to smart hub 532, where the control information causes smart hub 532 to communicate with the smart door lock 534 to disable access credential. As can be appreciated, this functionality enables access credentials to be disabled quickly, significantly enhancing the security services that may be provided to the residents of the multi-family residential property.

As another example, due to the bandwidth capabilities of the cellular communication link to smart hub 532, a resident or property management personnel may be able to provide improved security to the apartment 530 by controlling a wireless camera 536 or other video capture device. The resident (e.g., via user device 140) or property manager (e.g., via server 130) may be able to remotely access and control wireless camera 536 to view a live or recorded video stream captured by wireless camera 536 for purposes of surveillance and monitoring the premises when the apartment 530 is vacant or the resident is temporarily away from the unit. In some implementations, wireless camera 536 may have motion sensing capabilities that trigger smart hub 532 to send an alert to user device 140 or server 130 when motion is detected in the vicinity of the apartment 530. The property manager may also be able to configure a monitoring schedule and other settings (e.g., motion sensitivity and other detection settings) of wireless camera 536 when the unit is vacant or the property manager is notified that the resident will be away on vacation or an extended period of time.

In yet another example, suppose that a resident of apartment 520 has moved out and apartment 520 is now vacant. As described above, the property management platform provided by server 130 may detect the status of the apartment 520 is now vacant and may automatically transmit control information to smart hub 522 to place various smart devices into vacant mode. For example, based on the control information, smart hub 522 may turn off one or more smart lights 526 within the apartment 520 and may configure a thermostat (not shown in FIG. 5) of the apartment 520 to a predetermined temperature. This capability may significantly reduce the power consumption of the multi-family residential facility, resulting in significant cost savings. Additionally, the control information provided to smart hub 522 may instruct smart hub 522 to communicate with the smart door lock 524 to disable the former resident's access credentials. This may prevent the former resident or someone possessing the former resident's access credentials from gaining unauthorized access to the apartment after resident has moved out.

Now suppose that apartment 540 is currently vacant, but a new resident is scheduled to move in soon. On the day the new resident is to move in, the property management platform provided by server 130 may transmit control information to smart hub 542 that instructs smart hub 452 to adjust a temperature setting of the thermostat for the apartment 540 in advance of the resident moving in. For example, the control information may be configured to cause the thermostat to start cooling the apartment an hour ahead of a scheduled move in time or at some pre-determined time of day so that the apartment is cooler (relative to the vacant mode) when the resident moves in.

Figure 6:
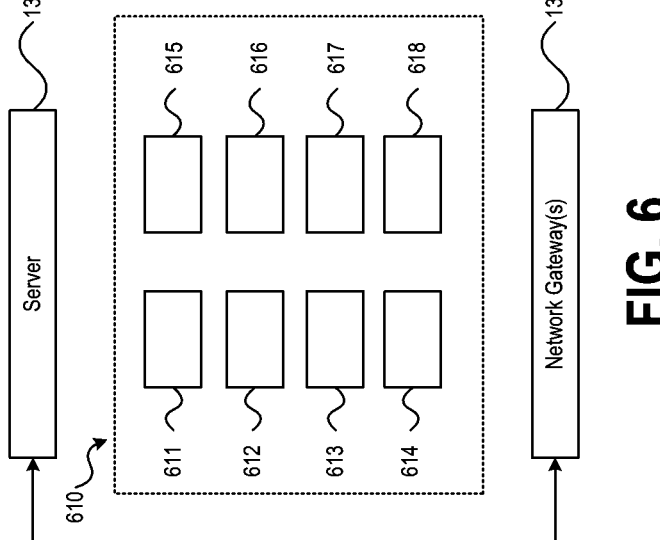
FIG. 6 is a block diagram illustrating additional aspects of an intelligent property management system configured in accordance with embodiments of the present disclosure.

Referring to FIG. 6, a block diagram illustrating additional aspects of an intelligent property management system configured in accordance with embodiments of the present disclosure is shown. As shown in FIG. 6, a multi-family residential property 610 may include a plurality of buildings 611, 612, 613, 614, 615, 616, 617, 618, each building having one or more floors and each floor having at least one apartment. As described an illustrated with respect to FIG. 5, each of the apartments may include a smart hub (e.g., smart thermostat hub 200 of FIG. 2, smart hub 300 of FIG. 3, or the modular smart thermostat hub 400 of FIG. 4), a smart door lock, and other smart devices. Each of smart hubs associated with the apartments of the buildings 611, 612, 613, 614, 615, 616, 617, 618 may communicate with a server 130 providing a management platform that provides various advantageous features for managing a multi-family residential property.

As illustrated in FIG. 6, intelligent property management systems in accordance with embodiments of the present disclosure may include one or more network gateways 620 in conjunction with server 130. The one or more network gateways 620 may be configured to communicatively couple one or more smart hubs to server 130 via a cellular network and/or to provide overlapping coverage areas for failover purposes. For example, the communication capabilities of the communication links may degrade in some environments or conditions, such as environments with many buildings. In such cases, providing the one or more network gateways 620 may ensure that all smart hubs deployed in a multi-family residential property are communicatively coupled to server 130. In an embodiment, the network gateway(s) 620 may be communicatively coupled to server 130 via a wired communication link (e.g., an Ethernet communication link) or wireless communication link (e.g., a mobile hotspot or other wireless access point providing the gateway with network-based access to server 130). In an embodiment, utilizing the one or more network gateways 620 may enable server 130 to be located at a location other than the multi-family residential property, such as at a corporate office of an entity that owns the multi-family residential property or at another location, or to enable the functionality provided by the server 130 to be access from the cloud. In such instances, access to the property management platform provided by server 130 may be facilitated through a web-based interface, which may be provided by the cloud-based service 152 of FIG. 1.

Figure 7:
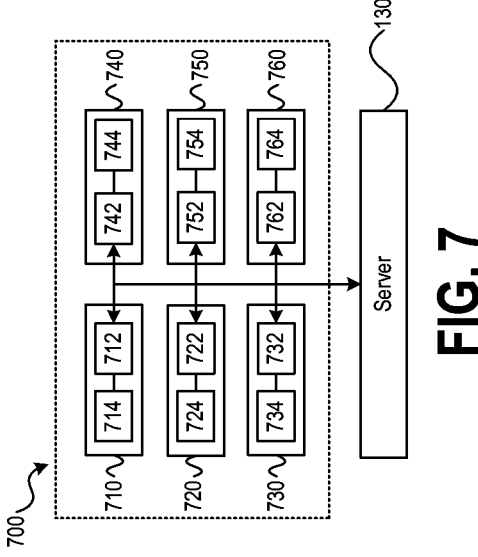
FIG. 7 is a block diagram illustrating additional aspects of an intelligent property management system configured in accordance with embodiments of the present disclosure.

Referring to FIG. 7, a block diagram illustrating additional aspects of an intelligent property management system configured in accordance with embodiments of the present disclosure is shown. As shown in FIG. 7, a multi-family residential property 700 may include a plurality of buildings 710, 720, 730, 740, 750, 760, each building having one or more floors and each floor having at least one apartment or residential unit. As described an illustrated with respect to FIG. 5, each of the apartment units may include a smart hub (e.g., smart thermostat hub 200 of FIG. 2, smart hub 300 of FIG. 3, or the modular smart thermostat hub 400 of FIG. 4), a smart door lock, and other smart devices. Each of the smart hubs associated with the apartment units of the buildings 710, 720, 730, 740, 750, 760 may communicate with server 130, which provides a property management platform that provides various features for managing a multi-family residential property, as described above with reference to FIGS. 1-4.

Although not wired and/or wireless communication infrastructure, such as Wi-Fi is not necessary to facilitate operation of intelligent property management systems in accordance with the embodiments disclosed herein, such features may provide additional capabilities when present. For example, as illustrated in FIG. 7, a plurality of access points 712, 722, 732, 742, 752, and 762 may be communicatively coupled to server 130 via wired communication links (e.g., Ethernet, etc.) and/or wireless communication links (e.g., Wi-Fi communication links). The bandwidth capabilities provided by the access points 712, 722, 732, 742, 752, and 762 may enable the intelligent property management system to provide video capabilities for improved security. For example, in FIG. 7, each of the buildings 710, 720, 730, 740, 750, and 760 may be equipped with one or more video cameras 714, 724, 734, 744, 754, and 764, respectively. The video cameras 714, 724, 734, 744, 754, and 764 may be communicatively coupled to server 130 via the access points 712, 722, 732, 742, 752, and 762, respectively, to facilitate video monitoring of areas of the multi-family residential property 700, as described above with respect to FIG. 5.

Referring to FIG. 8, a flow diagram illustrating an exemplary method for securing smart devices within an apartment of a multi-family residential property in accordance with embodiments of the present disclosure is shown as method 800. In an embodiment, steps of the method 800 may be stored as instructions that, when executed by one or more processors, cause the one or more processors to perform operations for securing smart devices within an apartment of a multi-family residential property, as described above with reference to FIGS. 1-7. It is noted that the method 800 may be performed by smart hub 110 of FIG. 1, smart thermostat hub 200 of FIG. 2, smart hub 300 of FIG. 3, and the modular smart thermostat hub 400 of FIG. 4.

As shown in FIG. 8, the method 800 may include, at step 810, receiving, by one or more processors of a smart thermostat hub, control information associated with a smart door lock from a property management platform via a cellular or other long range communication link where the control information identifies one or more access credentials to be disabled with respect to the smart door lock. At a step 820, the method 800 may include generating, by the one or more processors of smart thermostat hub, a command configured to disable the one or more access credentials identified in the control information. In a step 830, the method 800 may include transmitting, by the one or more processors, the command to the smart door lock via a short-range or non-LoRa-based communication link (e.g., a WPAN). As described above with reference to FIGS. 1-7, by using a smart thermostat hub in accordance with embodiments of the present disclosure, the method 800 may provide improved security for residents of a multi-family residential property, such as by facilitating access credentials for a smart door lock to be disabled remotely, rather than requiring property management personnel to visit the apartment and couple an external device to the smart door lock.

It is noted that the concepts of method 800 may further facilitate additional advantageous operations. For example, instead of receiving control information for disabling access credentials of the smart door lock, smart thermostat hub may receive control information configured to control operations of a thermostat, a light fixture, or another smart device present in an apartment where smart thermostat hub is located, or may receive control information configured to retrieve status information from a memory of the smart door lock. In a manner similar to steps 810 and 820, this additional control information may be received via a LoRa-based (e.g., cellular) communication link and may cause smart thermostat hub to generate one or more commands for controlling operation of smart devices identified by the control information, as described above with reference to FIGS. 1-7. After the one or more commands associated with the additional control information are generated, the smart thermostat hub may transmit the one or more additional commands to the appropriate smart devices via a short-range or non-LoRa-based communication link. Utilizing a smart thermostat hub and LoRa-based communication links to provide control information to smart devices may reduce the cost of deploying an intelligent property management system, such as the intelligent property management system described above with reference to FIG. 1. In aspects, the method 800 may also be utilized to create access credentials for one or more smart door locks, remotely unlock a smart door lock, or other operations described above with reference to FIGS. 1-7.

Referring to FIG. 9, a flow diagram of an exemplary method for retrieving access log data from a smart door lock is shown as a method 900. In an embodiment, steps of the method 900 may be stored as instructions that, when executed by one or more processors, cause the one or more processors to perform operations for securing smart devices within an apartment of a multi-family residential property, as described above with reference to FIGS. 1-7. It is noted that the method 900 may be performed by smart hub 110 of FIG. 1, smart thermostat hub 200 of FIG. 2, smart hub 300 of FIG. 3, and the modular smart thermostat hub 400 of FIG. 4.

At step 910, the method 900 includes transmitting, by one or more processors of a smart thermostat hub, an access log request to a smart door lock via a short-range or non-LoRa-based communication link (e.g., a WPAN). The access log request may be configured to retrieve at least a portion of access log information stored at a memory of the smart door lock. As described above with reference to FIG. 1, smart thermostat hub may be configured to transmit the access log request to the smart door lock in response to control information received from a property management platform (e.g., the property management platform provided by server 130 of FIGS. 1, 5, 6, and 7) and the control information may specify the portion of the access log to be retrieved. At step 920, the method 900 may include receiving, by the one or more processors of smart thermostat hub, at least the portion of the access log information from a lock processor of the smart door lock via the non-LoRa-based communication link and at step 930, the method 900 may include transmitting, by the one or more processors of smart thermostat hub, at least the portion of the access log information to the property management platform via a LoRa-based (e.g., cellular) communication link. As described above, transmission of at least the portion of the access log information to the property management platform may be performed periodically, and may also be performed based on scheduling information received from the property management platform.

It is noted that operations of the method 900 may improve the security of residents of a multi-family residential property. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the smart door lock and provide that status to the resident(s). If the door was found to be unlocked, the resident may contact the property management office to request that property management personnel visit the apartment and secure the smart door lock.

Referring to FIG. 10, a flow diagram illustrating an exemplary method for securing a smart door lock of an apartment of a multi-family residential property in accordance with embodiments of the present disclosure is shown as method 1000. In an embodiment, steps of the method 1000 may be stored as instructions that, when executed by one or more processors, cause the one or more processors to perform operations for securing a smart door lock of an apartment of a multi-family residential property, as described above with reference to FIGS. 1-5. In an embodiment, the method 1000 may be performed by a smart door lock, such as the smart door lock 1200 of FIG. 12.

The method 1000 may include, at step 1010, receiving, by a lock processor of a smart door lock, a command via a non-LoRa-based (e.g., WPAN) communication link. As described above with reference to FIGS. 1 and 5, as well as FIG. 8, the command may be received from a smart thermostat hub, and may include information for disabling one or more access credentials associated with the smart door lock. At step 1020, the method 1000 may include modifying, by the lock processor, access credential validation information stored at a memory of the smart door lock to disable the one or more access credentials based on the command. As disclosed herein, modifying access credential validation information may include deleting a portion of access credential validation information corresponding to the one or more access credentials identified in the control information. Additionally or alternatively, modifying access credential validation information may include configuring one or more flags corresponding to the one or more access credentials identified in the control information to have a particular flag value. The one or more flags may be stored with access credential validation information and the particular flag value may indicate a corresponding access credential is disabled.

At step 1030, the method 1000 may include receiving, by a sensor of the smart door lock, access credential information from a credential device placed in proximity to the sensor. As described herein, the credential device may include a smartphone, a fob, a smartcard or another type of device provided with an access credential. At step 1040, the method 1000 may include determining, by the lock processor, a validity of access credential information based on whether access credential validation information indicates access credential information is valid or disabled and at step 1050, the method 1000 may include engaging, in response to a determination that access credential is valid, a locking mechanism of the smart door lock such that the locking mechanism is configurable to change between locked state and an unlocked state. It is noted that the method 1000 may provide functionality that is complimentary to the functionality provided by the method 800. Additionally, as described above with reference to FIGS. 1-6, providing an intelligent property management system that includes a smart thermostat hub to enable access credentials for smart locks to be remotely disabled in accordance with the method 1000 provides improved security for residents of a multi-family residential property, such as by facilitating access credentials for a smart door lock to be disabled remotely, rather than requiring property management personnel to visit the apartment and couple an external device to the smart door lock. Further, it is noted that although the method 1000 is described as providing functionality for disabling access credentials, the method 1000 may also be utilized to provide other functionality described herein with respect to operations of a smart door lock in accordance with aspects of the present disclosure, such as authorize new credentials.

Referring to FIG. 11, a flow diagram illustrating an exemplary method for securing a smart door lock of an apartment of a multi-family residential property in accordance with embodiments of the present disclosure is shown as method 1100. In an embodiment, steps of the method 1100 may be stored as instructions that, when executed by one or more processors, cause the one or more processors to perform operations for securing a smart door lock of an apartment of a multi-family residential property, as described above with reference to FIGS. 1 and 5. In an embodiment, the method 1100 may be performed by a smart door lock, such as the smart door lock 1200 of FIG. 12.

At step 1110, the method 1100 may include storing, by a lock processor of a smart door lock, access log information at a memory of the smart door lock. As disclosed herein, the access log may comprise access credential information associated with access credentials presented to the sensor and/or status information identifying changes to a state of a locking mechanism of the smart door lock. Additionally, the access log information may comprise time stamps associated with the time that particular information was recorded to the access log. At step 1120, the method 1000 may include receiving, by the lock processor, an access log request via a non-LoRa-based (e.g., WPAN) communication link. At step 1130, the method 1100 may include transmitting, by the lock processor, at least the portion of the access log information to a smart thermostat hub via the non-LoRa-based communication link. As described above with respect to FIGS. 1 and 5, the access log request may be received by the lock processor from a smart thermostat hub that is in communication with a property management platform, and the request for access log information may ultimately be provided to the property management platform or another destination, such as a graphical user interface associated with the cloud-based service 152 of FIG. 1.

It is noted that the method 1100 provides functionality that is complimentary to, and may be used on coordination with, the functionality provided by the method 900. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the smart door lock and provide that status to the resident(s). If the door was found to be unlocked, the resident may contact the property management office to request that property management personnel visit the apartment and secure the smart door lock. Thus, it is to be appreciated that the operations of the method 1100, individually or in coordination with other processes, such as the method 900 described with reference to FIG. 9, may improve the security of residents of a multi-family residential property.

Figure 12:
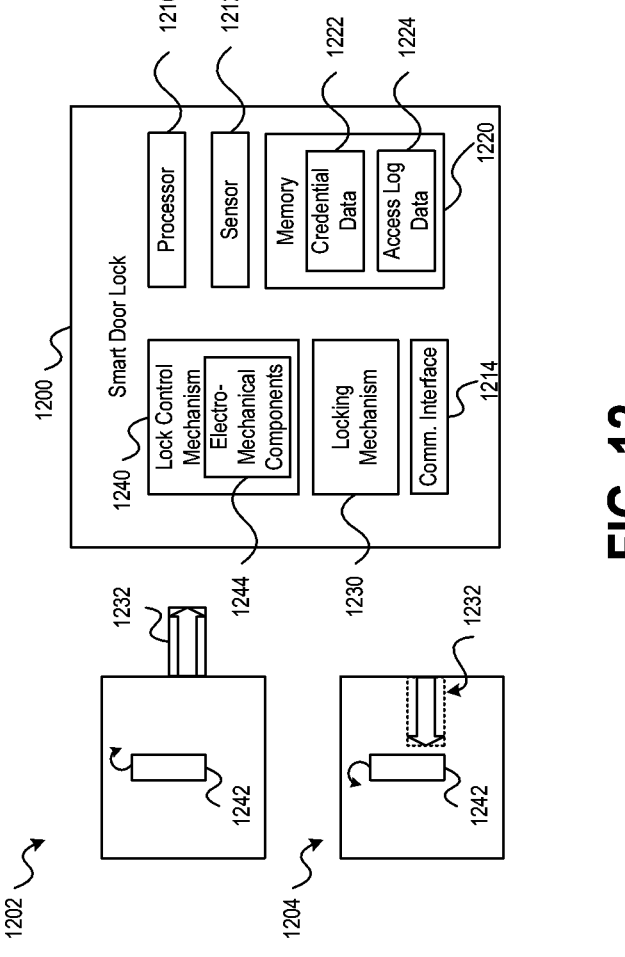
FIG. 12 is a block diagram illustrating exemplary features of a smart door lock configured in accordance with embodiments of the present disclosure.

Referring to FIG. 12, a block diagram illustrating exemplary features of a smart door lock configured in accordance with embodiments of the present disclosure is shown as a smart door lock 1200. As shown in FIG. 12, the smart door lock 1200 may include a lock processor 1210, a sensor 1212, a communication interface 1214, a memory 1220, a locking mechanism 1230, and a lock control mechanism 1240. The sensor 1212 may be configured to receive access credential information from a credential device placed in proximity to the sensor 1212. For example, the sensor 1212 may be configured to utilize near field communication (NFC) or Bluetooth communication to receive access credentials from an credential device (e.g., a resident's smartphone, a fob, a smartcard, and the like). Communication interface 1214 may be configured to communicatively couple the smart door lock 1200 to smart hub 110 via a short-range or WPAN communication link, such as a Bluetooth communication link, for example. In an embodiment, the sensor 1212 may be omitted and the communication interface 1214 may be configured to utilize one or more WPAN communication links, such as a Bluetooth communication link, a Zigbee communication link, and/or other types of short-range communication links, to communicate with a smart thermostat hub and/or to receive, disable, or otherwise manage access credentials, as described herein.

In an embodiment, communication interface 1214 may include one or more cellular communication interfaces configured to communicatively couple the smart door lock 1200 directly to a remote system, such as a property management platform configured in accordance with embodiments of the present disclosure. In such an embodiment, rather than communicating with a smart hub to perform various operations with respect to the smart door lock 1200, as described above, the property management platform, which may be provided via server 130 of FIG. 1, may communicate control information directly to smart door lock 1200 via a gateway (e.g., network gateway 136 of FIG. 1) within the cellular network, such as to retrieve at least a portion of the log information maintained by smart door lock 1200, manage access credentials associated with smart door lock 1200, or other operations described herein. In some implementations, the gateway may be a cellular gateway device or a LoRa gateway device that supports low-power long-range radio communication between server 130 and the smart door lock 1200 or other smart devices. Because smart door lock 1200 includes, at least in the embodiment described in this example, a cellular-based communication interface, smart door lock 1200 may be able to bi-directionally communicate with the property management platform, such as to transmit a requested portion of the access log information to the property management platform via a cellular gateway using cellular communication links, as described above and as will be described in further detail below with respect to FIG. 14.

As shown in FIG. 12, memory 1220 of the smart door lock 1200 may store access credential validation information 1222 and access log data 1224. Additional aspects of access credential validation information 1222 and the access log data are described in more detail above with reference to FIGS. 1-6. As described above, the lock processor 1210 may be configured to determine a validity of access credential information presented to the sensor 1212 (or the communication interface 1214) based on the access credential validation information 1222. Additionally, the lock processor 1210 may be configured to selectively engage the lock control mechanism 1240 based on whether access credential is valid.

In an embodiment, the locking mechanism 1230 comprises a deadbolt 1232 and the lock control mechanism 1240 may comprise a rotatable member 1242. The locking mechanism 1230 may be configurable to change between the locked state and the unlocked state via rotation of the rotatable member. For example, in response to successful authentication of access credentials presented to the sensor 1212 (e.g., the presented access credential information is determined to be valid), the lock processor 1210 may engage the lock control mechanism 1240, and the engagement of the lock control mechanism 1240 may facilitate interaction between the lock control mechanism 1240 and the locking mechanism 1230. For example, engagement of the lock control mechanism 1240 may configure the rotatable member 1242 such that rotation of the rotatable member 1242 in a first direction drives the deadbolt 1232 to a first position corresponding to the locked state, as shown at 1202, and rotation of the rotatable member 1242 in a second direction drives the deadbolt 1232 to a second position corresponding to the unlocked state, as shown at 1204. The lock processor 1210 may be configured to ignore invalid or disabled credentials. In such instances, interaction between the lock control mechanism 1240 and the locking mechanism 1230 may be prohibited. For example, when an invalid or disabled credential is presented, the lock control mechanism 1240 may not be engaged by the lock processor 1210 in response to receipt of an invalid access credential and the locking mechanism 1230 may be maintained in a current state (e.g., either the locked state or the unlocked state). In such instances, the rotatable member 1242 may freely rotate without impacting the locking mechanism 1230. As another example, rotation of the rotatable member 1242 may be prevented, thereby causing the lock control mechanism to maintain a current state (e.g., either the locked state or the unlocked state). Thus, in the absence of engagement of the locking mechanism 1230, the locking mechanism 1230 may remain in the locked state or the unlocked state (e.g., until a valid credential is presented).

In an embodiment, the lock control mechanism 1240 may include one or more electro-mechanical components 1244, such as one or more circuits, motors, actuators, gears, or other components, configured to electrically, mechanically, or electro-mechanically configure the locking mechanism 1230 to change between the locked state and the unlocked state. For example, in response presentation of a valid access credential, the one or more electro-mechanical components 1244 may be activated to automatically drive the deadbolt 1232 to the first position or the second position. In response to presentation of an invalid access credential, the one or more electro-mechanical components may be configured to maintain the locking mechanism 1230 in a current state (e.g., the deadbolt 1232 may be maintained at the first position or the second position). In embodiments comprising a smart door lock 1200 that includes electro-mechanical components 1244, the smart door lock 1200 may further include a power supply, such as a battery or other power source, configured to supply operational power to the electro-mechanical components 1244.

In addition to controlling the electro-mechanical components 1244 in response to valid access credentials, in an embodiment, the lock processor 1210 may be configured to activate or otherwise control the electro-mechanical components 1244 to configure the locking mechanism 1230 to change between the locked state and the unlocked state in response to commands received via a short-range or wireless personal area network (WPAN) communication link, such as commands received from a smart hub configured in accordance with embodiments of the present disclosure. As described above, the smart hub may be configured to generate such commands (e.g., lock commands and/or unlock commands) responsive to control information provided by a property management platform (e.g., the system 100 of FIG. 1) via a cellular communication link (e.g., via server 130 and network gateway 136 of FIG. 1). Additionally, the control information received at the smart hub may be generated by the property management platform in response to information received via a user interface, such as the user interface described above that allows a resident (or property management personnel) to verify a status of the smart door lock as locked or unlocked. For example, if a status check indicates the smart door lock is unlocked, a request may be initiated from the user interface to property management platform to lock the smart door lock. In response to such a request, control information identifying the smart door lock and including an instruction to configure the smart door lock to the locked state may be communicated to the appropriate smart hub via the cellular communication link and then the commands may be provided from the smart hub to the smart door lock via a short-range or WPAN communication link, such as a Bluetooth low energy (BLE) communication link, a Zigbee communication link, a Zwave communication link, etc.

In an embodiment, the smart door lock 1200 may not be configured to facilitate the use of remote unlock commands irrespective of whether the smart door lock 1200 includes the electro-mechanical components 1244. For example, although access credentials may be disabled or enabled/provided via commands received from a smart hub in response to control information transmitted to the smart hub by a property management platform, the smart door lock 1200 may be prevented from enabling the locking mechanism to change between the locked state and the unlocked state via commands received from the smart hub. In this example, the smart door lock 1200 may only enable the locking mechanism to change between the locked state and the unlocked state when a valid access credential is received (e.g., via the sensor 1212 or the communication interface 1214) from a user device (e.g., smartphone, etc.) or third party device (e.g., a fob, a smartcard, etc.).

Figure 13:
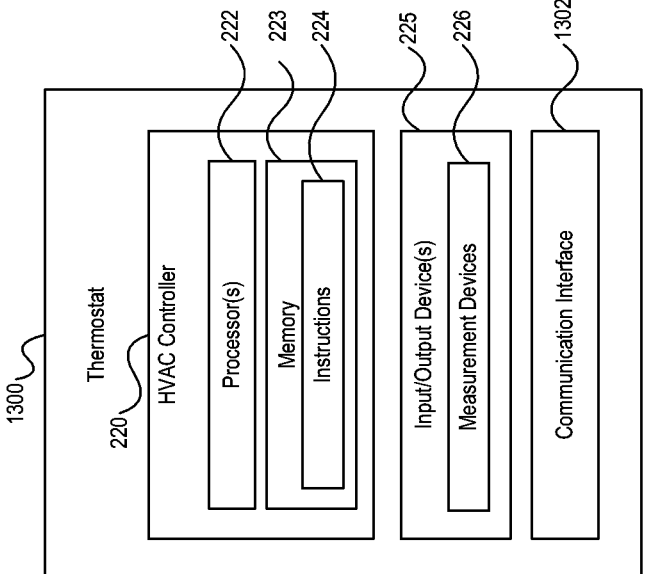
FIG. 13 is a block diagram illustrating an embodiment of a smart thermostat in accordance with embodiments of the present disclosure.

Referring to FIG. 13, a block diagram illustrating an example of a smart thermostat 1300 in accordance with embodiments of the present disclosure. As shown in FIG. 13, the smart thermostat 1300 may include the components illustrated with respect to the thermostat component 410 of FIG. 4, however, rather than including the smart hub interface 412, the smart thermostat 1300 may include a communication interface 1302. In such an embodiment, the smart thermostat 1300 may be communicatively coupled to a property management platform (e.g., the system 100 of FIG. 1) via a cellular communication link, and may receive control information from the property management platform directly, as opposed to receiving commands derived from control information by a smart hub. Such a direct communication link may enable operational aspects of the smart thermostat 1300 to be configured, such as temperature settings, operating modes, and the like as described above, to be configured via control information provided by the property management platform (e.g., via server 130 and gateway 136 of FIG. 1) without requiring a smart hub to be provided in proximity to or in connection with the smart thermostat 1300. In this manner, the advantages provided by utilizing a smart hub to control a thermostat, such as to place the thermostat into vacant mode or other advantageous operations, may be provided by the smart thermostat 1300 directly, thereby providing a more cost effective solution for situations where the additional functionality provided by the smart hub (e.g., short-range communication with smart door locks and other smart devices) may not be desired or practical.

Figure 14:
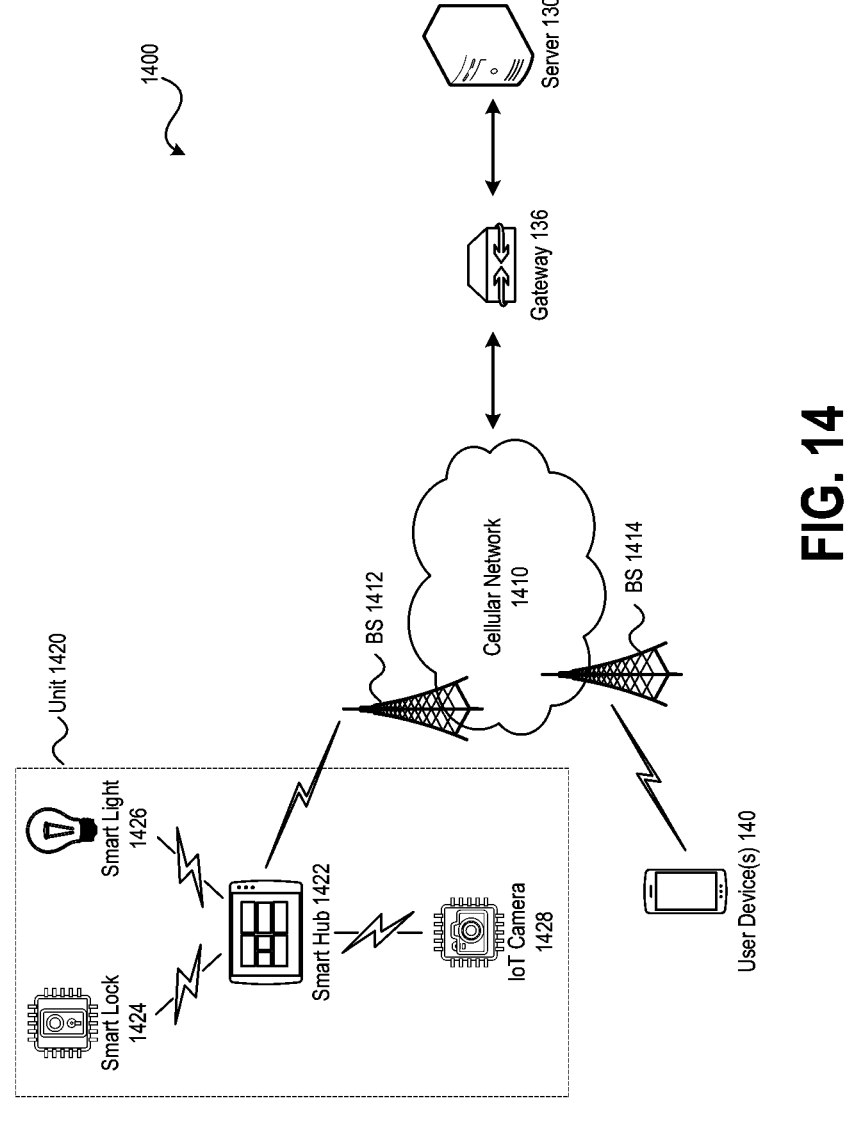
FIG. 14 is a block diagram of a system for remotely managing and controlling smart devices within a unit of a multi-family residential property over a cellular communication network in accordance with embodiments of the present disclosure.

FIG. 14 is a block diagram of an exemplary system 1400 for remotely managing and controlling smart devices within a unit of a multi-family residential property over a cellular communication network in accordance with embodiments of the present disclosure. For discussion purposes, system 1400 will be described with reference to various components of system 100 of FIG. 1, as described above, but system 1400 is not intended to be limited thereto.

As shown in FIG. 14, system 1400 includes a server 130 that communicates over a cellular network 1410 with one or more user devices 140 and a smart hub 1422 of a unit 1420 of the multi-family residential property. As described above, server 130 may be used to provide a property management platform for remotely managing and controlling the smart devices associated with unit 1420. Cellular network 1410 may include a GSM network, a GPRS network, a CDMA network, a FDMA network, an OFDMA network, a SDMA network, or any other type of cellular network described herein, and cellular network 1410 may support any of various cellular communication standards and technologies described herein, including, but not limited to, 3G, 4G, LTE, 5G, and new technologies being developed, such as 6G. Unit 1420 may be one of a plurality of units within the multi-family residential property, where each unit has its own smart hub and associated smart devices, e.g., as described above with respect to FIG. 5. Unit 1420 may represent, for example, an apartment or residential unit (e.g., apartment 520 of FIG. 5) of a resident within the multi-family residential property or a designated common area or facility of the property (e.g., a fitness center, a laundry room, a clubhouse, etc.) used by various residents. In some implementations, smart hub 1422 may be a smart thermostat hub (e.g., smart thermostat hub 200 of FIG. 2 or modular smart thermostat hub 400 of FIG. 4, as described above) installed on an interior wall of unit 1420. In such implementations, smart hub 1422 is capable of controlling one or more thermostat settings in addition to communicating with other smart devices and server 130. In some other implementations, smart hub 1422 is a smart device hub that communicates with a smart thermostat device and other smart devices. User device(s) 140 in this example may be a mobile device associated with a resident of the multi-family residential property. As will be described in further detail below, the resident may use an application executed by user device 140 to remotely control one or more smart devices of unit 1420 via a communication interface of smart hub 1422. Such smart devices may include, for example, a smart lock 1424, a smart light 1426, a wireless or Internet of Things (IoT) camera 1428, and a smart thermostat integrated with or coupled to smart hub 1422. IoT camera 1428 may be, for example, a webcam or a wireless security camera that can be remotely controlled by the property manager via server 130 or by the resident via user device 140. The resident in this example may use the application at user device 140 to view a live or recorded video stream captured by camera 1428 for purposes of surveillance and monitoring unit 1420 when it is unoccupied. Due to the bandwidth capabilities of cellular network 1410, video captured by IoT camera 1428 may be streamed in real-time (or near real-time) to user device 140 or server 130. By contrast, networks that rely on other types of long-range wireless communication technologies may lack the bandwidth to support real-time streaming of video or multimedia content.

In some embodiments, server 130 may be communicatively coupled to a gateway 136 that relays communications between server 130 and other devices (including smart hub 1422 and user device 140) over cellular network 1410. While gateway 136 is shown separately from cellular network 1410 in FIG. 14, it should be appreciated that gateway 136 in some implementations may be a cellular gateway within cellular network 1410 that is communicatively coupled to server 130. In other implementations, gateway 136 may be a LoRa gateway device outside of cellular network 1410 that enables low-power long-range radio communications utilizing low-power or LoRa-based communication links (e.g., based on LTE-M or NB-IoT technology standards) between server 130 and other devices via cellular network 1410. However, it should be appreciated that embodiments are not limited thereto and that any of various network gateways may be used as appropriate or desired for a particular implementation.

In the example shown in FIG. 14, cellular network 1410 may be used to facilitate communications between smart hub 1422 and other computing devices, including server 130 and user device(s) 140. Cellular network 1410 may support any of various cellular communication standards, protocols, and technologies. Examples of such standards and protocols include, but are not limited to, 3G, 4G, Long Term Evolution (LTE), and 5G. Examples of cellular technologies that may be supported by cellular network 1410 include, but are not limited to, Global System for Mobile Communications (GSM), General Packet Radio Service (GPRS), Code-Division Multiple Access (CDMA), Frequency-Division Multiple Access (FDMA), Orthogonal Frequency-Division Multiple Access (OFDMA), Space-Division Multiple Access (SDMA), multiple-input and multiple-output (MIMO), etc.

In some embodiments, cellular network 1410 may be associated with a wireless operator or carrier. An operator or carrier can be, for example and without limitation, a wireless service provider that provides various communication services to mobile phone subscribers. The services provided by the carrier may include, for example and without limitation, messaging services for sending messages with text and/or multimedia content over Internet Protocol (IP) networks including the Internet or similar networks. As will be described in further detail below, messaging services involving the communication of secured or encrypted data may be provided by the wireless carrier/operator using a secure communication channel via a radio access network (e.g., 3G or 4G data network) of the overall mobile communication network. In some implementations, this radio access network may be of a different type than the radio access network (e.g., based on One (1) times (x) Radio Transmission Technology or "1×RTT") used for voice calls routed through the overall mobile communication network.

While not shown in FIG. 14, it should be appreciated that cellular network 1410 may include any number of intermediate network routers, gateways (e.g., including gateway 136), or servers between network components/devices. It should also be appreciated that individual elements (e.g., switches, gateways and/or routers) forming the traffic network are omitted from FIG. 14 for ease of discussion. Although not separately shown, cellular network 1410 may include or communicate with any number of service control elements. Such service control elements may include, for example, elements for authenticating smart hub 1422 and user devices 140 to access cellular network 1410. Additionally, such elements may include authorization control elements for authorizing users or devices for accessing various communication services and features offered by cellular network 1410. Further, such elements may include a billing system for purposes of usage accounting and billing functions of cellular network 1410. Some of these functions may require the transmission of authentication credentials or information from smart hub 1422 and user device(s) 140 (e.g., on a periodic basis for security reasons).

In some implementations, cellular network 1410 may include an inter-carrier or other intermediate network gateway to enable communications between cellular network 1410 and the cellular communication networks of different wireless carriers. Cellular network 1410 offers a variety of text and other data services, including services via the Internet. Such services may include, for example and without limitation, services for downloading applications and other types of content, web browsing, and various messaging services, including exchange services for electronic mail ("e-mail") as well as Short Messaging Service (SMS) and Multimedia Messaging Service (MMS) for sending and receiving text and multimedia messages, respectively. Such messaging services may also provide support for secured message communications (e.g., secured text and/or multimedia messages) between, for example, a user of a user device 140 and other mobile device users or a property manager (e.g., via server 130) through cellular network 1410 and/or other communication networks (e.g., the Internet).

In some implementations, the data traffic portion of cellular network 1410 connects to other public packet switched data communication networks (not shown) in addition to the Internet. Packet switched communications via the traffic network of cellular network 1410 and the Internet may support a variety of messaging and other types of communications services for mobile device users. As such, the wireless carrier or service provider that operates cellular network 1410 generally also operates a number of systems that provide ancillary functions in support of the communications services provided through cellular network 1410. For example, cellular network 1410 may include one or more message servers, which may be used to provide different types of messaging services to various devices (e.g., smart hub 1422 and/or user devices 140) through cellular network 1410. Examples of such message servers include, but are not limited to, a short message service center (SMSC) server for SMS messages, a multimedia message service center (MMSC) server for MMS messages, an enhanced message service center (EMSC) server for enhanced messaging service (EMS) messages, and the like.

In some implementations, cellular network 1410 includes multiple interconnected access networks for providing voice and data communication services to mobile device subscribers/users. Hence, cellular network 1410 overall may include a number of radio access networks (RANs), as well as regional ground networks interconnecting a number of RANs and a wide area network (WAN) interconnecting the regional ground networks to core network elements. A regional portion of cellular network 1410, such as that serving user device(s) 140 or smart hub 1422, will typically include one or more RANs and a regional circuit and/or packet switched network and associated signaling network facilities. Physical elements of a RAN are generally operated by a mobile network operator or wireless carrier of cellular network 1410. Such physical elements include a number of base stations, as represented in the example shown in FIG. 14 by a base station (BS) 1412 and a base station 1414.

Although not separately shown, each of base stations 1412 and 1414 may include a base transceiver system (BTS). A BTS communicates via an antennae system at the site of the respective base stations 1412 and 1414 via an over-the-air communication link with one or more mobile devices that are within a particular signal coverage range of the BTS. The BTS is the part of the radio network that sends and receives RF signals to/from smart hub 1422 and user device(s) 140, as served by base stations 1412 and 1414, respectively. The BTS may utilize transceiver equipment to implement communications in accordance with the appropriate cellular communication standards and protocols supported by the network, e.g., for purposes of signaling, registration, voice communication, data communication, etc. Thus, each of base stations 1412 and 1414 is configured to broadcast certain standardized information (e.g., in accordance with appropriate cellular communication protocols) to smart hub 1422 and user device(s) 140 (in addition to any other mobile devices (not shown) within range of the particular base station) so as to enable each device to find and establish a communication link with the base station via cellular network 1410.

In some implementations, device-specific information for each device may be stored within a network database (not shown) in association with a unique device identifier for that device. Examples of such a unique mobile device identifier may include, but are not limited to, a mobile device identifier is a Mobile Directory Number ("MDN"), a Mobile Equipment Identifier ("MEID") or a Mobile Identifier Number ("MIN"). For example, the mobile device identifier associated with a mobile device may be used by the wireless carrier to identify the particular device for determining whether or not the device is on the same or a different wireless carrier's mobile communication network, as will be described in further detail below.

The device-specific information may include, for example, subscriber data related to different subscribers or users of the connected devices (e.g., user devices 140, smart hub 1422, or other smart devices) for purposes of accessing secured messaging services provided through cellular network 1410. The subscriber data may also include security credentials associated with a subscriber/user associated with each device for authenticating the particular subscriber/user to send and receive secured messages through cellular network 1410.

In an example, secure messages and notifications relating to an operating status or one or more operating settings of a smart device associated with unit 1420 may be transmitted from smart hub 1422 over cellular network 1410 and displayed via a graphical user interface (GUI) of a client or mobile application executable at user device(s) 140, as will be described in further detail below with respect to FIG. 15.

Figure 15:
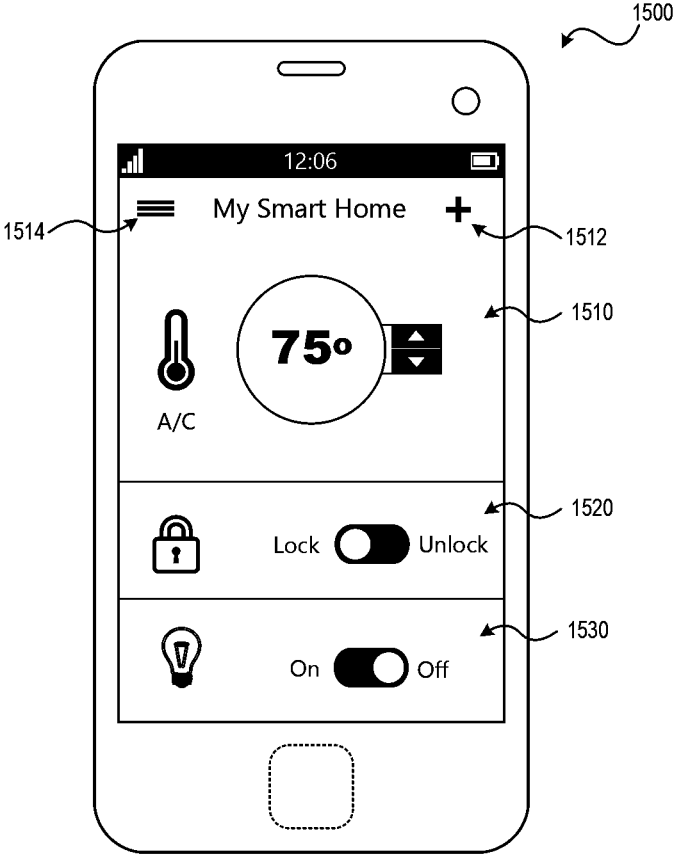
FIG. 15 is an exemplary graphical user interface (GUI) of a mobile application for providing smart device access control features to a mobile device user in accordance with embodiments of the present disclosure.

FIG. 15 shows an example of a GUI 1500 of a mobile application for providing a user (e.g., a resident of unit 1420 of FIG. 14) of a mobile device (e.g., user device 140 of FIG. 14) with remote access and control features for smart devices in accordance with embodiments of the present disclosure. GUI 1500 may be used by the resident to determine a current operating status as well as to change the operating settings of the various smart devices (e.g., the smart thermostat coupled to smart hub 1422, smart lock 1424, and smart light 1426 of FIG. 14) installed at the resident's apartment unit. As shown in FIG. 15, GUI 1500 includes separate control panels 1510, 1520, and 1530 corresponding to the various smart devices. Control panel 1510 allows the resident to view the smart thermostat's current temperature setting and adjust the temperature, e.g., by using control buttons to increase or decrease the temperature. Control panel 1520 allows the resident to view the lock status of the smart lock and provides a slider control to either lock or unlock the smart lock. Control panel 1530 allows the resident to view the status of the smart light and provides a slider control to turn on or off the smart light. In some embodiments, GUI 1500 may include a control button 1512 that enables the resident to add new control panels for additional smart devices that are later installed at the apartment unit. GUI 1500 may also include a settings button 1514 that allows the resident to access additional controls or settings (e.g., notification settings) associated with the smart devices or smart thermostat hub.

Referring back to FIG. 14, smart hub 1422 of unit 1420 in this example may be one of a plurality of smart hubs corresponding to different units of the multi-family residential property, where each unit may have its own smart hub and associated smart devices. In some embodiments, the plurality of smart hubs (or a portion thereof) may be communicatively coupled to one another via a mesh network, e.g., a local area network, such as a WPAN (e.g., a Wi-Fi, Zigbee, Bluetooth, or other short-range wireless communication network) in a mesh topology. In some embodiments, the mesh network may include a cellular backhaul connection to facilitate the remote property management functionality provided by server 130 over cellular network 1410, as will be described in further detail below with respect to FIG. 16.

Figure 16:
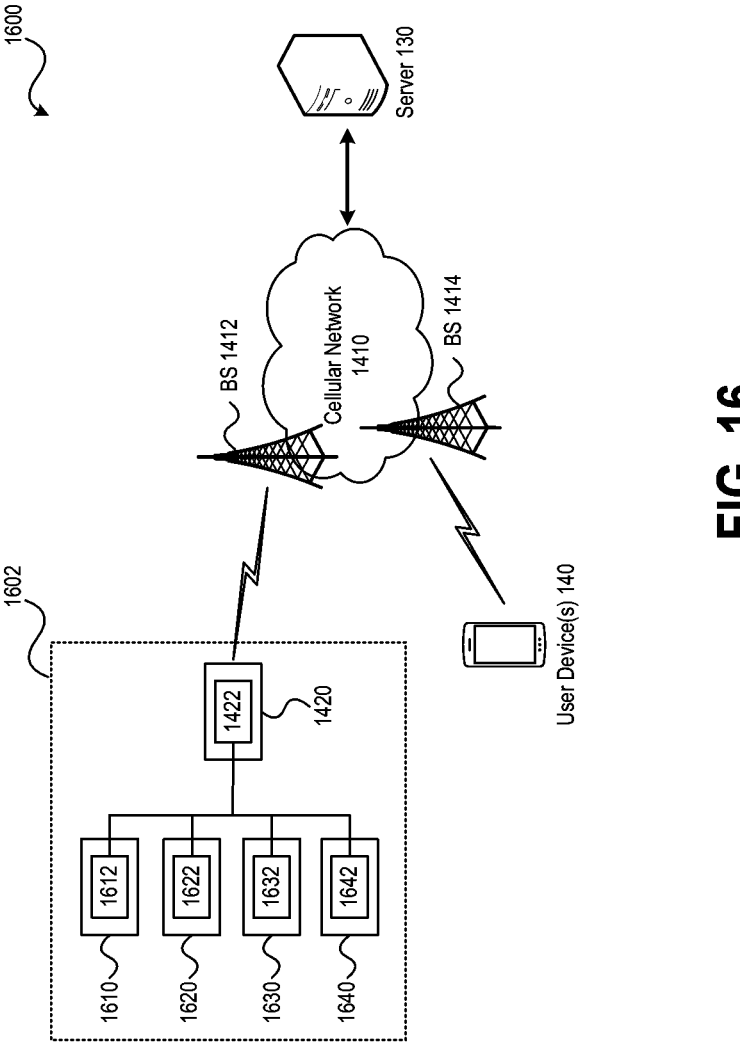
FIG. 16 is a block diagram of a system for remotely managing and controlling smart devices within different units of a multi-family residential property using a mesh network with a cellular backhaul in accordance with embodiments of the present disclosure.

FIG. 16 is a block diagram of a system 1600 for remotely managing and controlling smart devices within different units of a multi-family residential property using a mesh network with a cellular backhaul in accordance with embodiments of the present disclosure. For discussion purposes, system 1600 will be described with reference to various components of system 1400 of FIG. 14, but system 1600 is not intended to be limited thereto.

As shown in FIG. 16, system 1600 includes a plurality of units 1420, 1610, 1620, 1630, and 1640 with smart hubs 1422, 1612, 1622, 1632, and 1642, respectively. Units 1420, 1610, 1620, 1630, and 1640 may include, for example, different residential units within an apartment building located on the multi-family residential property as well as one or more designated common areas or facilities (e.g., a fitness center, a laundry room, a clubhouse, etc.) near the apartment building. As other examples, units 1420, 1610, 1620, 1630, and 1640 may include different rooms in a dormitory or campus housing building, different rooms or units of a hotel or other short term rental property, different units of one or more condominiums, or the like. In some embodiments, smart hubs 1422, 1612, 1622, 1632, and 1642 may be communicatively coupled to one another via a mesh network 1602, e.g., a WPAN, associated with the building. Mesh network 1602 may represent, for example, one of various mesh networks corresponding to different apartment buildings located throughout the multi-family residential property. As will be described in further detail below, smart hubs 1422, 1612, 1622, 1632, and 1642 may represent different access points or nodes in mesh network 1602, where one of the nodes (e.g., smart hub 1422) is selected to operate as a cellular backhaul or gateway for communications between mesh network 1602 and a remote property management platform provided by server 130 over cellular network 1410. It is assumed for purposes of this example that smart hubs 1422, 1612, 1622, 1632, and 1642 are located in proximity to or sufficiently near one another to support short-range communications via mesh network 1602. It is also assumed for purposes of this example that smart hub 1422 is designated as the cellular backhaul for mesh network 1602.

Although not shown in FIG. 16, it should be appreciated that each of units 1420, 1610, 1620, 1630, and 1640 may include any number of smart devices (e.g., smart door locks, smart lights, smart thermostats, wireless cameras, security devices, smart TVs, smart speakers, entertainment devices, etc.). It should also be appreciated that any number of smart devices may be assigned to a smart hub in a unit of the property (e.g., smart hub 1612 in unit 1610). Such devices may include, for example, new smart devices that get installed within the same unit (e.g., unit 1610) as well as existing devices that may be located in a nearby unit (e.g., unit 1620) but get reassigned to the smart hub, as will be described in further detail below. Further, while only units 1420, 1610, 1620, 1630, and 1640 are shown in FIG. 16, it should be appreciated that the disclosed property management techniques are not limited thereto and that these techniques may be applied to smart devices associated with any number of units within various apartment buildings of a multi-family residential property.

In some embodiments, smart hub 1422 (as the designated cellular backhaul of mesh network 1602) may be configured to establish a cellular backhaul connection with the property management platform at server 130 over cellular network

1410. Accordingly, smart hub 1422 may serve as a gateway for routing communications between smart hubs 1612, 1622, 1632, and 1642 (as different access points in mesh network 1602) and the property management platform via the cellular backhaul connection. Such communications may include, for example, requests or commands sent by server 130 via the cellular backhaul connection for remotely managing and controlling various smart devices installed within units 1420, 1610, 1620, 1630, and 1640. Such communications may also include information reported by each smart hub to server 130 for purposes of monitoring operating conditions associated with the one or more smart devices assigned to that smart hub, as will be described in further detail below.

For example, server 130 may send a status request via the cellular backhaul connection for checking the status of a smart door lock installed at one of the units (e.g., unit 1610) associated with mesh network 1602. The status request may be received by smart hub 1422, operating as the gateway of the cellular backhaul connection, and then relayed to the corresponding smart hub (e.g., smart hub 1612) of the unit via mesh network 1602. Likewise, status information relating to the smart door lock (e.g., as received from smart hub 1612 in response to the status request) may be relayed by smart hub 1422 to server 130 via the cellular backhaul connection. In some implementations, the status request sent by server 130 may include control information identifying the smart lock and the smart hub with which it is associated. Such information may be stored at, for example, a database (e.g., database 135 of FIG. 1, as described above) or a cloud-based service (e.g., cloud-based service 152 of FIG. 1, as described above) accessible to server 130. Alternatively, such information may be stored within an internal memory of smart hub 1422, e.g., as part of a table that includes a mapping of smart hubs and associated smart devices. Such a device mapping may be used by smart hub 1422 to identify the appropriate smart hub assigned to each smart device managed by the property management platform.

By default, each of the smart devices installed in a unit of the multi-family residential property may be mapped or assigned to a corresponding smart hub located in that unit. For various reasons, however, one or more of the smart devices in one unit (e.g., unit 1610) may need to be reassigned from its default hub (e.g., smart hub 1612) to another smart hub located in a second unit (e.g., smart hub 1622 of unit 1620). Such reasons may include, but are not limited to, maintaining the performance or reliability of mesh network 1602 (e.g., due to a malfunction or failure of the smart hub located in the first unit) and maintaining network security (e.g., in cases where the security of the smart hub in question has been compromised).

In some embodiments, the property management platform at server 130 may dynamically reassign smart devices to different smart hubs as needed to maintain or optimize network performance, reliability, and/or security. For example, the property management platform may monitor the operating conditions associated with each of smart hubs 1422, 1612, 1622, 1632, and 1642, identify any smart device assigned to a smart hub that should be reassigned to a different hub based on the monitored conditions over time, and dynamically reassign the identified smart device accordingly. Alternatively, the property management platform may notify a property manager of any abnormal operating conditions or other issues affecting communications within mesh network 1602. In response to the notification, the property manager may use a web-based interface of the property management platform provided by server 130 or an associated cloud-based service (e.g., cloud-based service 152 of FIG. 1, as described above) to manually assign or reassign smart devices to smart hubs as needed or desired for a particular implementation.

In some embodiments, the operating conditions of the smart hubs and devices may be monitored by the property management platform based on information reported to server 130 by each smart hub. The reported information may include, for example, information regarding the operating status of each smart hub as well as the status and strength of the connection between the smart hub and each of its assigned or nearby smart devices. Such information may be reported on a periodic basis, e.g., according to a predefined schedule specified by the property management platform, or on demand, e.g., in response to a request sent by server 130 over cellular network 1410. The reported information may be aggregated and routed, or individually routed, by smart hub 1422 (or any smart hub operating as a gateway) to server 130 via the cellular backhaul connection. The reported information may be used by the property management platform to detect potential smart hub failures or malfunctions in addition to out-of-range conditions or other conditions in the local environment or vicinity of a smart hub (e.g., physical obstructions, third-party electrical devices, or other sources of noise or interference) that may affect communications with a smart device. The property management platform may then take corrective action as needed to address any detected abnormalities or issues.

For example, unit 1610 of FIG. 16 may be a multi-level residential unit in which a new smart lock is installed for a front door on a first level of unit 1610 while smart hub 1612 may be located in a back room on a second level of unit 1610. Based on the information reported by smart hub 1612 in this example, such as signal strength measurements or other network connectivity information, the property management platform at server 130 may determine that smart hub 1612 is located at a distance that is out of range of the smart lock or too far away to effectively communicate with the smart lock. Accordingly, the property management platform may notify the property manager of a potential out-of-range condition that was detected with respect to the newly installed smart lock, which the property manager may choose to reassign to another smart hub, e.g., smart hub 1622 in unit 1620, by using the web-based interface of the property management platform as described above. Alternatively, the property management platform may dynamically reassign the smart lock to the nearest smart hub identified by the platform within a neighboring unit or within a predetermined distance or range of the smart lock's location and thus, sufficiently close to communicate effectively with the smart lock.

In some embodiments, the property management platform may be configured to maintain an optimal mapping of smart devices to smart hubs as operating conditions change over time. For example, the relative distances between each smart device and the various smart hubs may change as new smart devices or hubs are added or replaced within the various units of the multi-family residential property. The relative distances may be determined by the property management platform based on additional information (e.g., connection status and relative signal strengths) reported by each smart hub with respect to nearby smart devices detected by the smart hub (e.g., within a detection zone of the smart hub). Such information may be reported to server 130 via the cellular backhaul of mesh network 1602, as described above. Based on the reported information, the property management platform may dynamically update the mapping of smart devices and hubs such that each smart device is assigned to its nearest smart hub, regardless of the unit in which the smart device is located. Such a mapping may be stored in the database (e.g., database 135 of FIG. 1) coupled to server 130 and used to update any existing mapping information stored within the internal memory of the designated cellular backhaul node of mesh network 1602 (e.g., smart hub 1422), as described above.

In some embodiments, the property management platform may use a similar approach to maintain an optimal configuration of mesh network 1602. For example, the property management platform may use the information reported by each smart hub to dynamically update the configuration of mesh network 1602 by selecting a different node to serve as the cellular backhaul according to the detected changes in the operating conditions over time. The cellular backhaul or gateway of mesh network 1602 at any given time may be dynamically selected from among the available smart hubs to optimize network performance and reliability. The property management platform may automatically switch the cellular backhaul from a currently designated node (e.g., smart hub 1422) of mesh network 1602 to a different node (e.g., smart hub 1622) if the operating conditions indicate, for example, that smart hub 1422 is no longer capable of serving as the cellular backhaul (e.g., due to a malfunction or changes in the operating environment that make communications unreliable) or if another smart hub would provide better service by operating as the cellular backhaul. For example, server 130 (or the property management platform via a communication interface of server 130) may send a series of commands over cellular network 1410 to switch the designated backhaul or gateway from smart hub 1422 to smart hub 1622. Server 130 may send a first command to enable a cellular backhaul connection of smart hub 1622 with server 130 via cellular network 1410. This first command may be received by smart hub 1422 (operating as the current backhaul or gateway) and then routed to smart hub 1622 via mesh network 1602. Responsive to receiving the first command, smart hub 1622 may enable its cellular interface, establish the cellular backhaul connection with server 130, and begin operating as the gateway/backhaul of mesh network 1602. Server 130 may then send a second command to disable its existing cellular backhaul connection with smart hub 1422. In some implementations, smart hub 1422 may be configured to automatically disable its cellular interface or backhaul connection with server 130 (and shut down in case of a malfunction) after routing the first command to smart hub 1622. In this case, server 130 would need to send only the first command to switch the gateway from one smart hub to the other. Alternatively, smart hub 1422 may perform such operations after receiving confirmation that smart hub 1622 is operating as the gateway. The confirmation may be sent to smart hub 1422 by server 130 or by smart hub 1622 via mesh network 1602 in response to the first command routed by smart hub 1422. It should be appreciated that the property management platform at server 130 may use any of various algorithms, such as Shortest Path Bridging (SPB), Transparent Interconnection of Lots of Links (TRILL), or other types of self-healing algorithms, to dynamically select a smart hub or node in mesh network 1602 as the backhaul/gateway and optimize the network configuration according to the current operating conditions. While such algorithms may be associated with routing-based mesh networks, it should be appreciated that embodiments are not limited thereto and that mesh network 1602 may support any of various mesh networking protocols and standards (e.g., Bluetooth low energy (BLE), Matter, Thread, Zigbee, Z-Wave, and the like) and any of various types of algorithms for reconfiguring or optimizing network communication paths.

In some embodiments, each of the nodes within mesh network 1602 may have the capability to serve as the cellular backhaul for routing communications between mesh network 1602 and server 130 over cellular network 1410. For example, each of smart hubs 1422, 1612, 1622, 1632, and 1642 may be equipped with the necessary hardware and software for supporting communications to or from server 130 via cellular network 1410. In some implementations, each of smart hubs 1422, 1612, 1622, 1632, and 1642 may have multiple network interfaces, including a cellular network interface and a network interface that supports short-range communications over mesh network 1602 and other short-range communication networks. Alternatively, some of smart hubs 1422, 1612, 1622, 1632, and 1642 may include a single network interface (e.g., a network interface that supports short-range communications over mesh network 1602 and other short-range communication networks) and are capable of communications with others of smart hubs 1422, 1612, 1622, 1632, and 1642 that also include a cellular network interface and are capable of operating as a cellular backhaul for the single-interface hubs. By designating only one of the nodes (e.g., smart hub 1422) in mesh network 1602 as the cellular backhaul, however, the costs associated with having multiple cellular connections (e.g., a dedicated cellular connection for each node) may be avoided without sacrificing the security and flexibility provided by long-range cellular communications for remote property management and control. Accordingly, the cellular capabilities of the remaining nodes (e.g., smart hubs 1612, 1622, 1632, and 1642) may be disabled, e.g., by the property manager using the web-based interface of the property management platform as described above. To further reduce costs, the property manager may also choose to limit the number of smart hubs with cellular capabilities that are used within the units of the multi-family residential property. In some implementations, the cellular capabilities of each smart hub may be included in the information reported to the property management platform via the cellular backhaul connection and stored along with the mapping information within the database coupled to server 130, as described above.

FIG. 17 is a flowchart of an exemplary process 1700 for managing smart devices associated with a multi-family residential property. As shown in FIG. 17, process 1700 begins at block 1710, in which a server (e.g., server 130, as described above) receives, from a first smart hub via a first communication network, information relating to operating conditions of each smart hub of a plurality of smart hubs. The plurality of smart hubs (including the first smart hub) may correspond to multiple units of the multi-family residential property. In some embodiments, the plurality of smart hubs may be communicatively coupled to each other via a second communication network. The first communication network may be a cellular network (e.g., cellular network 1410 of FIGS. 14 and 16, as described above) and the second communication network may be a mesh network (e.g., mesh network 1602 of FIG. 16, as described above). The mesh network may include short-range wireless communication links between the plurality of smart hubs. The first smart hub may operate as a gateway of the mesh network for relaying communications between the server via the cellular network and other smart hubs of the plurality of smart hubs via the mesh network.

At block 1720, the server monitors the operating conditions of each smart hub of the plurality of smart hubs based on the information received at block 1710. At block 1730, the server may detect a change in the operating conditions of the first smart hub operating as the gateway based on the monitoring. At block 1740, the server may select, based on the detected change in the operating conditions of the first smart hub, a second smart hub of the plurality of smart hubs to operate as the gateway.

At block 1750, the server may transmit, to the first smart hub via the first communication network (e.g., cellular network 1410), one or more commands to switch the gateway from the first smart hub to the second smart hub in the second communication network (e.g., mesh network 1602).

FIG. 18 is a flowchart of an exemplary process 1800 for configuring smart devices within multiple units of a multi-family residential property. Process 1800 begins at block 1810, which includes receiving, by a first smart hub in a first unit of the multi-family residential property from a server via a first communication network (e.g., cellular network 1410, as described above), control information for at least one smart device in a second unit of the multi-family residential property.

At block 1820, the first smart hub may identify a second smart hub associated with the at least one smart device in the second unit of the multi-family residential property. In some embodiments, the first smart hub may identify the second smart hub based on a device mapping stored within a memory of the first smart hub, as described above. At block 1830, the first smart hub may transmit, to the second smart hub via a second communication network (e.g., mesh network 1602, as described above), the control information received from the server for the at least one smart device. In some embodiments, the control information may include a command for the second smart hub to configure one or more operational settings of the at least one smart device.

In some embodiments, the first and second smart hubs in this example may be among a plurality of smart hubs corresponding to the multiple units of the multi-family residential property, where the smart hubs are communicatively coupled to each other via the second communication network. The second communication network may be, for example, a mesh network (e.g., mesh network 1602) with short-range wireless communication links between the plurality of smart hubs. Like the first smart hub in process 1700 of FIG. 17 described above, the first smart hub here may operate as a gateway (or cellular backhaul) of the second communication network for relaying communications between the server via the first communication network (e.g., cellular network 1410) and other smart hubs (including the second smart hub) of the plurality of smart hubs via the second communication network (e.g., mesh network 1602).

Figure 19:
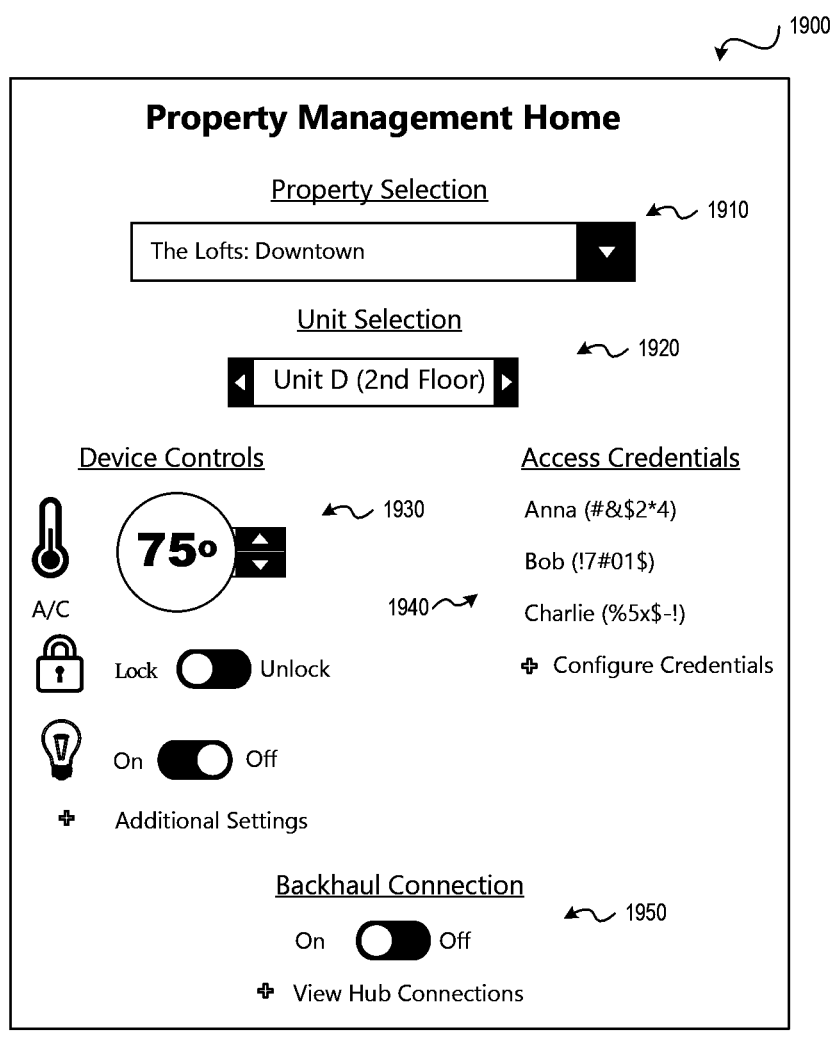
FIG. 19 is an exemplary GUI of an application for providing smart device access control features, credential management features for smart locks, and/or cellular backhaul connection control to a property management platform user in accordance with embodiments of the present disclosure.

FIG. 19 shows an example of a GUI 1900 of an application for providing a property manager of a property management platform (e.g., server 130 of FIGS. 14 and 16, or a client device that communicates with server 130 to perform operations described herein) with remote access and control features for smart devices, credential management features for smart locks, cellular backhaul connection control for smart hubs, or a combination thereof, in accordance with embodiments of the present disclosure.

GUI 1900 may be used by a property manager, or an employee of a property management company, to determine current operating statuses as well as to change the operating settings of the various smart devices (e.g., the smart thermostat coupled to or controlled by smart hub 1422, smart lock 1424, smart light 1426 of FIG. 14 and smart hubs 1422,

1612, 1622, 1632, and 1642 of FIG. 16) installed at one or more apartment units or properties. As shown in FIG. 19, GUI 1900 includes control panels 1910, 1920, 1930, 1940, and 1950 corresponding to the various aspects of property management. Although five separate control panels are shown in FIG. 19, in other embodiments, less than five or more than five control panels may be included in GUI 1900, and information in one or more of the control panels shown in FIG. 19 may instead by displayed in one or more other control panels. Control panel 1910 allows the property manager to select a property for which to view information and control elements. In some embodiments, control panel 1910 may include a dropdown button or other selectable element to enable selection of one or more properties associated with the property manager. Control panel 1920 allows the property manager to select a unit of the selected property for which to view status information and provide instructions for controlling aspects of smart devices and backhaul connections. In some embodiments, control panel 1920 may include arrow buttons or other selectable elements to enable selection of one or more units of the selected property. Although referred to as unit selection, control panel 1920 may also enable selection of non-unit areas, such as common areas and outdoor areas, that contain smart hub(s) and smart device(s).

Control panel 1930 allows the property manager to view a smart thermostat's current temperature setting and adjust the temperature, e.g., by using control buttons to increase or decrease the temperature. Control panel 1930 also allows the property manager to view the lock status of a smart lock and provides a slider control to either lock or unlock the smart lock. Control panel 1930 also allows the property manager to view the status of a smart light and provides a slider control to turn on or off the smart light. In some embodiments, control panel 1930 may include an additional settings button that allows the property manager to access additional controls or settings, such as notification settings, scheduling settings, security settings, or the like, associated with the smart devices or smart thermostat hub in the selected unit of the selected property. Control panel 1940 allows the property manager to view the access credentials configured at a smart lock of the selected unit. In the example shown in FIG. 19, the access credentials are currently enabled: a first credential for first user (e.g., "Anna", as represented by the character string following Anna), a second credential for a second user (e.g., "Bob"), and a third credential for a third user (e.g., "Charlie"). Control panel 1940 may also include a configure credentials button that enables the property manager to configure the access credentials for the smart lock of the selected unit as further described above, such as by adding additional access credential(s) or by deleting or otherwise invalidating existing access credential(s).

Control panel 1950 allows the property manager to configure a cellular backhaul communication link at the smart hub of the selected unit. In some embodiments, control panel 1950 may provide a slider control to view the status of and either enable or disable a cellular backhaul connection. Referring back to FIG. 16, smart hub 1422 of unit 1420 in this example may be one of a plurality of smart hubs (e.g., 1612, 1622, 1632, and 1642) corresponding to different units (e.g., 1610, 1620, 1630, and 1640) of the multi-family residential property, where each unit may have its own smart hub and associated smart devices. In some embodiments, the plurality of smart hubs (or a portion thereof) may be communicatively coupled to one another via a mesh network, e.g., a local area network, such as a WPAN (e.g., a Wi-Fi, Zigbee, Bluetooth, or other short-range wireless communication network) in a mesh topology. In some embodiments, smart hub 1422 may provide a cellular backhaul connection to facilitate the remote property management functionality provided by server 130 over cellular network 1410, as described in further detail above with respect to FIG. 16. Using GUI 1900, the property manager may change configurations of smart hubs such that the cellular connection of smart hub 1422 is disabled and instead a cellular connection of smart hub 1632 (or another smart hub) is enabled to provide a cellular backhaul connection for the mesh network formed by smart hubs 1422, 1612, 1622, 1632, and 1642.

Although the embodiments of the present disclosure and their advantages have been described in detail, it should be understood that various changes, substitutions and alterations can be made herein without departing from the spirit and scope of the disclosure as defined by the appended claims. It should be noted that although the descriptions provided above with respect to FIGS. 1-19 have been described with reference to multi-family residential properties, embodiments of the present disclosure may be readily applied to other types of properties, such as commercial properties (e.g., office spaces, warehouses, storage units, malls, and the like). Accordingly, it is to be understood that embodiments of the present disclosure are not limited to use with multi-family residential properties. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of managing smart devices associated with a multi-family residential property, the method comprising:

receiving, by a server from a first smart hub of a plurality of smart hubs via a first communication network, information relating to operating conditions of each smart hub of the plurality of smart hubs, wherein the plurality of smart hubs correspond to multiple units of the multi-family residential property, wherein the plurality of smart hubs are communicatively coupled to each other via a second communication network, and wherein the first smart hub of the plurality of smart hubs is operable as a gateway for relaying communications between the server via the first communication network and other smart hubs of the plurality of smart hubs via the second communication network;

monitoring, by the server, the operating conditions of each smart hub of the plurality of smart hubs based on the received information;

detecting, by the server, a change in the operating conditions of the first smart hub operating as the gateway based on the monitoring;

selecting, by the server and based on the detected change in the operating conditions of the first smart hub, a second smart hub of the plurality of smart hubs to operate as the gateway for relaying communications between the server via the first communication network and the other smart hubs of the plurality of smart hubs via the second communication network; and transmitting, by the server to the first smart hub via the first communication network, one or more commands to switch the gateway from the first smart hub to the second smart hub in the second communication network.

2. The method of claim 1, wherein the first communication network is a cellular network, wherein the second communication network is a mesh network with short-range wireless communication links between the plurality of smart hubs, and wherein the gateway corresponds to a cellular backhaul of the mesh network.

3. The method of claim 2, wherein the one or more commands comprise a series of commands including a first command to enable a cellular backhaul connection of the second smart hub and a second command to disable the cellular backhaul connection of the first smart hub.

4. The method of claim 2, wherein monitoring the operating conditions comprises:

monitoring the short-range wireless communication links between the first smart hub and each of the other smart hubs in the mesh network, and wherein detecting the change in the operating conditions of the first smart hub comprises:

detecting a change in an operational status of at least one short-range wireless communication link between the first smart hub and at least one of the other smart hubs.

5. The method of claim 1, wherein each of the multiple units of the multi-family residential property includes one or more smart devices assigned to a corresponding smart hub of the plurality of smart hubs, and wherein the method further comprises:

maintaining, by the server, a mapping of the one or more smart devices assigned to each smart hub of the plurality of smart hubs.

6. The method of claim 5, further comprising:

detecting, by the server, a malfunction of a third smart hub of the plurality of smart hubs based on monitored operating conditions associated with the third smart hub;

responsive to the detected malfunction, identifying, by the server, a fourth smart hub located within a predetermined range of at least one smart device assigned to the third smart hub; and transmitting, by the server to the first smart hub via the first communication network, control information to reassign the at least one smart device to the fourth smart hub.

7. The method of claim 6, wherein the control information identifies the at least one smart device and includes instructions to control one or more operational settings of the at least one smart device.

8. The method of claim 7, wherein the at least one smart device is a smart lock installed within a separate unit of the multi-family residential property than a unit that is associated with the fourth smart hub, and wherein the fourth smart hub is located within a predetermined range of a location of the smart lock.

9. The method of claim 6, further comprising:

updating, by the server, the mapping of the one or more smart devices assigned to the respective third and fourth smart hubs based on the reassignment of the at least one smart device from the third smart hub to the fourth smart hub.

10. A system comprising:

a processor; and a memory coupled to the processor, the memory storing instructions, which, when executed by the processor, cause the processor to perform a plurality of operations, including operations to:

receive, from a first smart hub of a plurality of smart hubs via a first communication network, information relating to operating conditions of each smart hub of the plurality of smart hubs, wherein the plurality of smart hubs correspond to multiple units of a multi-family residential property, wherein the plurality of smart hubs are communicatively coupled to each other via a second communication network, and wherein the first smart hub of the plurality of smart hubs operates as a gateway for relaying communications via the first communication network and other smart hubs of the plurality of smart hubs via the second communication network;

monitor the operating conditions of each smart hub of the plurality of smart hubs based on the received information;

detect a change in the operating conditions of the first smart hub operating as the gateway, based on the monitoring;

select, based on the detected change in the operating conditions of the first smart hub, a second smart hub of the plurality of smart hubs to operate as the gateway for relaying communications between a server via the first communication network and the other smart hubs of the plurality of smart hubs via the second communication network; and transmit, to the first smart hub via the first communication network, one or more commands to switch the gateway from the first smart hub to the second smart hub in the second communication network.

11. The system of claim 10, wherein the first communication network is a cellular network, wherein the second communication network is a mesh network with short-range wireless communication links between the plurality of smart hubs, and wherein the gateway corresponds to a cellular backhaul of the mesh network.

12. The system of claim 11, wherein the one or more commands is a series of commands including a first command to enable a cellular backhaul connection of the second smart hub and a second command to disable the cellular backhaul connection of the first smart hub.

13. The system of claim 12, wherein the operations performed by the processor further include operations to:

monitor the short-range wireless communication links between the first smart hub and each of the other smart hubs in the mesh network, and detect a change in an operational status of at least one short-range wireless communication link between the first smart hub and at least one of the other smart hubs.

14. The system of claim 10, wherein each of the multiple units of the multi-family residential property includes one or more smart devices assigned to a corresponding smart hub in the plurality of smart hubs, and wherein the operations performed by the processor further include operations to:

maintain a mapping of the one or more smart devices assigned to each smart hub of the plurality of smart hubs.

15. The system of claim 14, wherein the operations performed by the processor further include operations to:

detect a malfunction of a third smart hub of the plurality of smart hubs, based on monitored operating conditions associated with the third smart hub;

identify a fourth smart hub located within a predetermined range of at least one smart device assigned to the third smart hub; and transmit, to the first smart hub via the first communication network, additional control information to reassign the at least one smart device to the fourth smart hub.

16. The system of claim 15, wherein the additional control information identifies the at least one smart device and includes commands to control one or more operational settings of the at least one smart device.

17. The system of claim 16, wherein the at least one smart device is a smart lock installed within a separate unit of the multi-family residential property than a unit that is associated with the fourth smart hub, and wherein the fourth smart hub is located within a predetermined range of a location of the smart lock.

18. The system of claim 17, wherein the operations performed by the processor further include operations to:

update the mapping of the one or more smart devices assigned to the respective third and fourth smart hubs based on the reassignment of the at least one smart device from the third smart hub to the fourth smart hub.

19. A method for configuring smart devices within multiple units of a multi-family residential property, the method comprising:

receiving, by a first smart hub in a first unit of the multi-family residential property from a server via a first communication network, control information for at least one smart device associated with a second smart hub in a second unit of the multi-family residential property; and transmitting, by the first smart hub to the second smart hub via a second communication network, the control information received from the server for the at least one smart device, wherein the first and second smart hubs are among a plurality of smart hubs communicatively coupled to each other via the second communication network, and wherein the first smart hub is operable as a gateway for relaying communications between the server via the first communication network and other smart hubs of the plurality of smart hubs via the second communication network, wherein the first communication network is a cellular network and corresponds to a backhaul connection for the second communication network, and wherein the second communication network is a short range network.

20. The method of claim 19, wherein the at least one smart device is communicatively coupled to the second smart hub via a third communication network associated with the second unit, and wherein the control information includes instructions for the second smart hub to control one or more operational settings of the at least one smart device via the third communication network.

21. The method of claim 19, wherein the control information identifies the at least one smart device, and wherein the first smart hub identifies the second smart hub associated with the at least one smart device based on a device mapping stored within a memory of the first smart hub.

22. The method of claim 19, wherein the first communication network is a cellular network, wherein the second communication network is a mesh network with short-range wireless communication links between the plurality of smart hubs, and wherein the gateway corresponds to a cellular backhaul of the mesh network.

23. The method of claim 22, further comprising:

receiving, by the first smart hub from each of the other smart hubs via the mesh network, information relating to operating conditions of each of the other smart hubs; and transmitting, by the first smart hub to the server via the cellular network, the received information and additional information relating to the operating conditions of the first smart hub.

24. The method of claim 22, further comprising:

receiving, by the first smart hub from the server via the cellular network, a command for a third smart hub of the plurality of smart hubs to operate as the gateway;

transmitting, by the first smart hub to the third smart hub via the mesh network, the command received from the server;

receiving, by the first smart hub from the third smart hub via the mesh network, a confirmation that the third smart hub is operating as the gateway; and disabling, by the first smart hub, a cellular backhaul connection of the first smart hub with the server in response to the confirmation received from the third smart hub.

25. The method of claim 24, further comprising:

reporting, by the first smart hub via the mesh network to the third smart hub operating as the gateway, information relating to operating conditions of the first smart hub.

* * * * *